US007778595B2

(12) United States Patent
White et al.

(10) Patent No.: US 7,778,595 B2
(45) Date of Patent: Aug. 17, 2010

(54) METHOD FOR MANAGING MEDIA

(75) Inventors: Russell W. White, Austin, TX (US); Kevin R. Imes, Austin, TX (US)

(73) Assignee: Affinity Labs of Texas, LLC, Frisco, TX (US)

( * ) Notice: Subject to any disclaimer, the term of this patent is extended or adjusted under 35 U.S.C. 154(b) by 0 days.

(21) Appl. No.: 12/015,320

(22) Filed: Jan. 16, 2008

(65) Prior Publication Data

US 2009/0017866 A1    Jan. 15, 2009

Related U.S. Application Data

(63) Continuation of application No. 10/947,755, filed on Sep. 23, 2004, now Pat. No. 7,324,833, and a continuation of application No. 09/537,812, filed on Mar. 28, 2000, now Pat. No. 7,187,947.

(51) Int. Cl.
H04H 40/00 (2008.01)
(52) U.S. Cl. ...................... 455/3.06; 455/566
(58) Field of Classification Search .................. None
See application file for complete search history.

(56) References Cited

U.S. PATENT DOCUMENTS

| 3,582,926 A | 6/1971 | Hassan |
| 4,291,749 A | 9/1981 | Ootsuka et al. |
| 4,314,232 A | 2/1982 | Tsunoda |
| 4,337,821 A | 7/1982 | Saito |
| 4,401,848 A | 8/1983 | Tsunoda |
| 4,407,564 A | 10/1983 | Ellis |
| 4,419,730 A | 12/1983 | Ito et al. |
| 4,441,405 A | 4/1984 | Takeuchi |
| 4,481,584 A | 11/1984 | Holland |
| 4,536,739 A | 8/1985 | Nobuta |
| 4,570,217 A | 2/1986 | Allen et al. |

(Continued)

FOREIGN PATENT DOCUMENTS

CA    2225910    12/1997

(Continued)

OTHER PUBLICATIONS

*Affinity Labs of Texas, LLC, Plaintiff, v. DICE Electronics, LLC; et al., Defendants,* C.A. No. 9:08-cv-00163 (Eastern District of Texas), Defendants' Motion to Stay Litigation Pending Reexamination, Filed Jan. 12, 2009, pp. 1-15.

(Continued)

*Primary Examiner*—Erika A Gary

(57) ABSTRACT

An audio system and method are disclosed. A system incorporating teachings of the present disclosure may include, for example, an electronic device having a display, a wireless receiver, and a housing component at least partially defining a cavity in which the wireless receiver is secured. The system may also include a device interface system that has a sound system connector and a mounting region. The sound system connector may communicatively coupled the device interface system to an existing sound system, and the mounting region may be capable of releasably engaging the electronic device such that a contact portion of the device interface system contacts a conductive element of the electronic device to form at least a portion of a communication path interconnecting the sound system and the electronic device.

25 Claims, 9 Drawing Sheets

U.S. PATENT DOCUMENTS

| | | |
|---|---|---|
| 4,582,389 A | 4/1986 | Wood et al. |
| 4,636,782 A | 1/1987 | Nakamura et al. |
| 4,716,458 A | 12/1987 | Heitzman et al. |
| 4,731,769 A | 3/1988 | Schaefer |
| 4,740,779 A | 4/1988 | Cleary et al. |
| 4,740,780 A | 4/1988 | Brown et al. |
| 4,752,824 A | 6/1988 | Moore |
| 4,795,223 A | 1/1989 | Moss |
| 4,802,492 A | 2/1989 | Grunstein |
| 4,807,292 A * | 2/1989 | Sorscher ............ 381/86 |
| 4,809,177 A | 2/1989 | Windle et al. |
| 4,812,843 A | 3/1989 | Champion, III et al. |
| 4,817,203 A | 3/1989 | Tsurumoto et al. |
| 4,818,048 A | 4/1989 | Moss |
| 4,827,520 A | 5/1989 | Zeinstra |
| 4,837,551 A | 6/1989 | Iino |
| 4,876,594 A | 10/1989 | Schiffman |
| 4,905,272 A | 2/1990 | Van de Mortel et al. |
| 4,914,705 A | 4/1990 | Nigawara |
| 4,977,509 A | 12/1990 | Pitchford et al. |
| 4,988,976 A | 1/1991 | Lu |
| 4,995,258 A | 2/1991 | Frank |
| 4,996,959 A | 3/1991 | Akimoto |
| 4,999,622 A | 3/1991 | Amano et al. |
| 5,006,829 A | 4/1991 | Miyamoto et al. |
| 5,051,735 A | 9/1991 | Furukawa |
| 5,070,323 A | 12/1991 | Iino et al. |
| 5,124,915 A | 6/1992 | Krenzel |
| 5,164,904 A | 11/1992 | Sumner |
| 5,179,385 A | 1/1993 | O'Loughlin et al. |
| 5,198,797 A | 3/1993 | Daidoji |
| 5,203,499 A | 4/1993 | Knittel |
| 5,214,413 A | 5/1993 | Okabayashi et al. |
| 5,214,707 A | 5/1993 | Fujimoto et al. |
| 5,214,793 A | 5/1993 | Conway et al. |
| 5,239,700 A | 8/1993 | Guenther et al. |
| 5,257,190 A | 10/1993 | Crane |
| 5,270,689 A | 12/1993 | Hermann |
| 5,274,560 A | 12/1993 | LaRue |
| 5,278,532 A | 1/1994 | Hegg et al. |
| 5,293,115 A | 3/1994 | Swanson |
| 5,299,132 A | 3/1994 | Wortham |
| 5,307,326 A | 4/1994 | Osawa |
| 5,327,558 A | 7/1994 | Burke et al. |
| 5,335,743 A | 8/1994 | Gillbrand et al. |
| 5,345,817 A | 9/1994 | Grenn et al. |
| 5,351,041 A | 9/1994 | Ikata et al. |
| 5,361,165 A | 11/1994 | Stringfellow et al. |
| 5,363,355 A | 11/1994 | Takagi |
| 5,371,510 A | 12/1994 | Miyauchi et al. |
| 5,388,248 A | 2/1995 | Robinson et al. |
| 5,400,045 A | 3/1995 | Aoki |
| 5,400,246 A | 3/1995 | Wilson et al. |
| 5,404,443 A | 4/1995 | Hirata |
| 5,408,686 A | 4/1995 | Mankovitz |
| 5,410,326 A | 4/1995 | Goldstein |
| 5,414,439 A | 5/1995 | Groves et al. |
| 5,416,318 A | 5/1995 | Hegyi |
| 5,418,962 A | 5/1995 | Bodin et al. |
| 5,420,573 A | 5/1995 | Tanaka et al. |
| 5,422,565 A | 6/1995 | Swanson |
| 5,432,904 A | 7/1995 | Wong |
| 5,440,428 A | 8/1995 | Hegg et al. |
| 5,442,553 A | 8/1995 | Parrillo |
| 5,442,557 A | 8/1995 | Kaneko |
| 5,450,321 A | 9/1995 | Crane |
| 5,450,471 A | 9/1995 | Hanawa et al. |
| 5,450,613 A | 9/1995 | Takahara et al. |
| 5,475,399 A | 12/1995 | Borsuk |
| 5,475,835 A | 12/1995 | Hickey |
| 5,479,157 A | 12/1995 | Suman et al. |
| 5,483,632 A | 1/1996 | Kuwamoto et al. |
| 5,486,840 A | 1/1996 | Borrego et al. |
| 5,488,357 A | 1/1996 | Sato et al. |
| 5,493,658 A | 2/1996 | Chiang et al. |
| 5,497,271 A | 3/1996 | Mulvanny et al. |
| 5,504,482 A | 4/1996 | Schreder |
| 5,504,622 A | 4/1996 | Oikawa et al. |
| 5,506,595 A | 4/1996 | Fukano et al. |
| 5,511,724 A | 4/1996 | Freiberger et al. |
| 5,519,410 A | 5/1996 | Smalanskas et al. |
| 5,523,559 A | 6/1996 | Swanson |
| 5,524,051 A | 6/1996 | Ryan |
| 5,525,977 A | 6/1996 | Suman |
| 5,528,248 A | 6/1996 | Steiner et al. |
| 5,528,496 A | 6/1996 | Brauer et al. |
| 5,532,684 A | 7/1996 | Katsu |
| 5,534,888 A | 7/1996 | Lebby et al. |
| 5,539,645 A | 7/1996 | Mandhyan et al. |
| 5,539,658 A | 7/1996 | McCullough |
| 5,539,869 A | 7/1996 | Spoto et al. |
| 5,543,789 A | 8/1996 | Behr et al. |
| 5,547,125 A | 8/1996 | Hennessee et al. |
| 5,553,661 A | 9/1996 | Beyerlein et al. |
| 5,555,172 A | 9/1996 | Potter |
| 5,555,286 A | 9/1996 | Tendler |
| 5,555,502 A | 9/1996 | Opel |
| 5,557,541 A | 9/1996 | Schulhof et al. |
| 5,568,390 A | 10/1996 | Hirota et al. |
| 5,576,724 A | 11/1996 | Fukatsu et al. |
| 5,586,090 A | 12/1996 | Otte |
| 5,587,560 A | 12/1996 | Crooks et al. |
| 5,594,709 A | 1/1997 | Nagano et al. |
| 5,594,779 A | 1/1997 | Goodman |
| 5,596,319 A | 1/1997 | Spry |
| 5,604,676 A | 2/1997 | Penzias |
| 5,614,895 A | 3/1997 | Ohomori et al. |
| 5,616,876 A | 4/1997 | Cluts |
| 5,619,412 A | 4/1997 | Hapka |
| 5,621,252 A | 4/1997 | Bucknam |
| 5,625,608 A | 4/1997 | Grewe et al. |
| 5,625,668 A | 4/1997 | Loomis et al. |
| 5,627,547 A | 5/1997 | Ramaswamy et al. |
| 5,638,305 A | 6/1997 | Kobayashi et al. |
| 5,639,305 A | 6/1997 | Brown et al. |
| 5,646,608 A | 7/1997 | Shintani |
| 5,650,929 A | 7/1997 | Potter et al. |
| 5,653,386 A | 8/1997 | Hennessee et al. |
| 5,654,715 A | 8/1997 | Hayashikura et al. |
| 5,657,221 A | 8/1997 | Warman et al. |
| 5,661,652 A | 8/1997 | Sprague et al. |
| 5,664,228 A | 9/1997 | Mital |
| 5,666,102 A | 9/1997 | Lahiff |
| 5,670,953 A | 9/1997 | Satoh et al. |
| 5,677,837 A | 10/1997 | Reynolds |
| 5,682,525 A | 10/1997 | Bouve et al. |
| 5,684,490 A | 11/1997 | Young et al. |
| 5,691,695 A | 11/1997 | Lahiff |
| 5,694,120 A | 12/1997 | Indekeu et al. |
| 5,699,056 A | 12/1997 | Yoshida |
| 5,699,255 A | 12/1997 | Ellis et al. |
| 5,702,165 A | 12/1997 | Koibuchi |
| 5,712,640 A | 1/1998 | Andou et al. |
| 5,715,474 A | 2/1998 | Burke et al. |
| 5,721,827 A | 2/1998 | Logan et al. |
| 5,732,216 A | 3/1998 | Logan et al. |
| 5,734,973 A | 3/1998 | Honda |
| 5,742,226 A | 4/1998 | Szabo et al. |
| 5,742,893 A | 4/1998 | Frank |
| 5,752,754 A | 5/1998 | Amitani et al. |
| 5,754,774 A | 5/1998 | Bittinger et al. |
| 5,754,775 A | 5/1998 | Adamson et al. |
| 5,757,359 A | 5/1998 | Morimoto et al. |
| 5,758,311 A | 5/1998 | Tsuji et al. |

| | | | | | | |
|---|---|---|---|---|---|---|
| 5,760,742 | A | 6/1998 | Branch et al. | 6,144,848 A | 11/2000 | Walsh et al. |
| 5,772,534 | A | 6/1998 | Dudley | 6,147,938 A | 11/2000 | Ogawa et al. |
| 5,774,070 | A | 6/1998 | Rendon | 6,148,261 A | 11/2000 | Obradovich et al. |
| 5,774,793 | A | 6/1998 | Cooper et al. | 6,150,925 A | 11/2000 | Casazza |
| 5,774,827 | A | 6/1998 | Smith, Jr. et al. | 6,151,634 A | 11/2000 | Glaser |
| 5,777,394 | A | 7/1998 | Arold | 6,157,619 A | 12/2000 | Ozluturk |
| 5,790,973 | A | 8/1998 | Blaker et al. | 6,157,725 A | 12/2000 | Becker |
| 5,790,974 | A | 8/1998 | Tognazzini | 6,160,551 A | 12/2000 | Naughton |
| 5,794,164 | A | 8/1998 | Beckert et al. | 6,161,071 A | 12/2000 | Shuman et al. |
| 5,798,759 | A | 8/1998 | Dahl | 6,163,079 A | 12/2000 | Miyazaki et al. |
| 5,806,018 | A | 9/1998 | Smith et al. | 6,163,711 A | 12/2000 | Juntunen et al. |
| 5,808,566 | A | 9/1998 | Behr et al. | 6,167,253 A | 12/2000 | Farris et al. |
| 5,812,870 | A | 9/1998 | Kikinis et al. | 6,169,515 B1 | 1/2001 | Mannings et al. |
| 5,819,160 | A | 10/1998 | Foladare et al. | 6,175,782 B1 | 1/2001 | Obradovich et al. |
| 5,822,098 | A | 10/1998 | Morgaine | 6,175,789 B1 | 1/2001 | Beckert et al. |
| 5,835,732 | A | 11/1998 | Kikinis et al. | 6,177,950 B1 | 1/2001 | Robb |
| 5,839,108 | A | 11/1998 | Daberko et al. | 6,178,403 B1 | 1/2001 | Detlef |
| 5,864,305 | A | 1/1999 | Rosenquist | 6,178,514 B1 | 1/2001 | Wood |
| 5,867,494 | A | 2/1999 | Krishnaswamy et al. | 6,182,006 B1 | 1/2001 | Meek |
| 5,870,680 | A | 2/1999 | Guerlin et al. | 6,185,491 B1 | 2/2001 | Gray et al. |
| 5,875,412 | A | 2/1999 | Sulich et al. | 6,189,057 B1 | 2/2001 | Schwanz et al. |
| 5,878,282 | A | 3/1999 | Mital | 6,192,340 B1 | 2/2001 | Abecassis |
| 5,900,564 | A | 5/1999 | Kurakake | 6,196,846 B1 | 3/2001 | Berger et al. |
| 5,908,464 | A | 6/1999 | Kishigami et al. | 6,199,076 B1 | 3/2001 | Logan et al. |
| 5,917,405 | A | 6/1999 | Joao | 6,201,540 B1 | 3/2001 | Gallup et al. |
| 5,919,239 | A | 7/1999 | Fraker et al. | 6,202,008 B1 | 3/2001 | Beckert et al. |
| 5,919,246 | A | 7/1999 | Waizmann et al. | 6,225,984 B1 | 5/2001 | Crawford |
| 5,926,624 | A | 7/1999 | Katz et al. | 6,230,322 B1 | 5/2001 | Saib et al. |
| 5,940,767 | A | 8/1999 | Bourgeois et al. | 6,232,539 B1 | 5/2001 | Looney et al. |
| 5,953,005 | A | 9/1999 | Liu | 6,233,430 B1 | 5/2001 | Helferich |
| 5,953,657 | A | 9/1999 | Ghisler | 6,236,832 B1 | 5/2001 | Ito |
| 5,953,659 | A | 9/1999 | Ghisler | 6,236,918 B1 | 5/2001 | Sonoda et al. |
| 5,956,029 | A | 9/1999 | Okada et al. | 6,240,297 B1 | 5/2001 | Jadoul |
| 5,956,651 | A | 9/1999 | Willkie | 6,240,347 B1 | 5/2001 | Everhart et al. |
| 5,963,916 | A | 10/1999 | Kaplan | 6,243,725 B1 | 6/2001 | Hempleman et al. |
| 5,969,283 | A | 10/1999 | Looney et al. | 6,246,935 B1 | 6/2001 | Buckley |
| 5,969,826 | A | 10/1999 | Dash et al. | 6,247,130 B1 | 6/2001 | Fritsch |
| 5,974,333 | A | 10/1999 | Chen | 6,253,061 B1 | 6/2001 | Helferich |
| 5,982,298 | A | 11/1999 | Lappenbusch et al. | 6,255,961 B1 | 7/2001 | Van Ryzin et al. |
| 5,987,381 | A | 11/1999 | Oshizawa | 6,262,724 B1 | 7/2001 | Crow et al. |
| 5,987,394 | A | 11/1999 | Takakura et al. | 6,275,231 B1 | 8/2001 | Obradovich |
| 5,990,803 | A | 11/1999 | Park | 6,278,531 B1 | 8/2001 | Tesavis |
| 5,999,525 | A | 12/1999 | Krishnaswamy et al. | 6,278,676 B1 | 8/2001 | Anderson et al. |
| 5,999,877 | A | 12/1999 | Takahashi et al. | 6,278,884 B1 | 8/2001 | Kim |
| 6,006,115 | A | 12/1999 | Wingate | 6,282,464 B1 | 8/2001 | Obradovich |
| 6,006,161 | A | 12/1999 | Katou | 6,289,382 B1 | 9/2001 | Bowman-Amuah |
| 6,009,355 | A | 12/1999 | Obradovich et al. | 6,292,440 B1 | 9/2001 | Lee |
| 6,009,363 | A | 12/1999 | Beckert | 6,292,743 B1 | 9/2001 | Pu et al. |
| 6,014,569 | A | 1/2000 | Bottum | 6,301,116 B1 | 10/2001 | Tamura |
| 6,014,689 | A | 1/2000 | Budge et al. | 6,314,094 B1 | 11/2001 | Boys |
| 6,018,571 | A | 1/2000 | Langlois et al. | 6,314,326 B1 | 11/2001 | Fuchu |
| 6,023,232 | A | 2/2000 | Eitzenberger | 6,332,163 B1 | 12/2001 | Bowman-Amuah |
| 6,023,241 | A | 2/2000 | Clapper | 6,335,927 B1 | 1/2002 | Elliott et al. |
| 6,029,064 | A | 2/2000 | Farris et al. | 6,339,706 B1 | 1/2002 | Tillgren et al. |
| 6,032,089 | A | 2/2000 | Buckley | 6,339,832 B1 | 1/2002 | Bowman-Amuah |
| 6,041,023 | A | 3/2000 | Lakhansingh | 6,344,861 B1 | 2/2002 | Naughton et al. |
| 6,047,234 | A | 4/2000 | Cherveny et al. | 6,349,352 B1 | 2/2002 | Lea |
| 6,047,327 | A | 4/2000 | Tso et al. | 6,353,637 B1 | 3/2002 | Mansour et al. |
| 6,055,478 | A | 4/2000 | Heron | 6,363,240 B2 | 3/2002 | Ito |
| 6,061,306 | A | 5/2000 | Buchheim | 6,377,825 B1 | 4/2002 | Kennedy et al. |
| 6,084,584 | A | 7/2000 | Nahi et al. | 6,396,164 B1 | 5/2002 | Barnea et al. |
| 6,088,730 | A | 7/2000 | Kato et al. | 6,396,769 B1 | 5/2002 | Polany |
| 6,091,067 | A | 7/2000 | Drobot et al. | 6,401,085 B1 | 6/2002 | Gershman et al. |
| 6,100,884 | A | 8/2000 | Tomita et al. | 6,407,750 B1 | 6/2002 | Gioscia et al. |
| 6,104,334 | A | 8/2000 | Allport | 6,418,138 B1 | 7/2002 | Cerf et al. |
| 6,114,970 | A | 9/2000 | Kirson et al. | 6,418,330 B1 | 7/2002 | Samsung |
| 6,115,669 | A | 9/2000 | Watanabe et al. | 6,418,421 B1 | 7/2002 | Hurtado et al. |
| 6,121,282 | A | 9/2000 | Dominianni et al. | 6,420,975 B1 | 7/2002 | DeLine et al. |
| 6,122,403 | A | 9/2000 | Rhoads | 6,421,305 B1 | 7/2002 | Gioscia et al. |
| 6,128,559 | A | 10/2000 | Saitou et al. | 6,422,941 B1 | 7/2002 | Thorner et al. |
| 6,131,060 | A | 10/2000 | Obradovich et al. | 6,425,018 B1 | 7/2002 | Kaganas et al. |
| 6,133,853 | A | 10/2000 | Obradovich et al. | 6,434,459 B2 | 8/2002 | Wong et al. |
| 6,144,358 | A | 11/2000 | Narayanaswamy et al. | 6,434,568 B1 | 8/2002 | Bowman-Amuah |

| | | |
|---|---|---|
| 6,434,628 B1 | 8/2002 | Bowman-Amuah |
| 6,438,594 B1 | 8/2002 | Bowman-Amuah |
| 6,442,748 B1 | 8/2002 | Bowman-Amuah |
| 6,446,080 B1 | 9/2002 | Van Ryzin et al. |
| 6,449,541 B1 | 9/2002 | Goldberg et al. |
| 6,453,281 B1 | 9/2002 | Walters |
| 6,456,892 B1 | 9/2002 | Dara-Abrams et al. |
| 6,476,825 B1 | 11/2002 | Croy |
| 6,477,580 B1 | 11/2002 | Bowman-Amuah |
| 6,477,665 B1 | 11/2002 | Bowman-Amuah |
| 6,493,546 B2 | 12/2002 | Patsiokas |
| 6,496,205 B1 | 12/2002 | White et al. |
| 6,496,692 B1 | 12/2002 | Shanahan |
| 6,496,850 B1 | 12/2002 | Bowman-Amuah |
| 6,501,832 B1 | 12/2002 | Saylor et al. |
| 6,502,213 B1 | 12/2002 | Bowman-Amuah |
| 6,507,762 B1 | 1/2003 | Amro et al. |
| 6,509,716 B2 | 1/2003 | Yi |
| 6,510,210 B1 | 1/2003 | Baughan |
| 6,510,325 B1 | 1/2003 | Mack, II et al. |
| 6,516,466 B1 | 2/2003 | Jackson |
| 6,526,335 B1 | 2/2003 | Treyz et al. |
| 6,529,909 B1 | 3/2003 | Bowman-Amuah |
| 6,529,948 B1 | 3/2003 | Bowman-Amuah |
| 6,539,396 B1 | 3/2003 | Bowman-Amuah |
| 6,549,942 B1 | 4/2003 | Janky et al. |
| 6,549,949 B1 | 4/2003 | Bowman-Amuah |
| 6,550,057 B1 | 4/2003 | Bowman-Amuah |
| 6,559,773 B1 | 5/2003 | Berry |
| 6,571,282 B1 | 5/2003 | Bowman-Amuah |
| 6,578,068 B1 | 6/2003 | Bowman-Amuah |
| 6,584,403 B2 | 6/2003 | Bunn |
| 6,587,127 B1 | 7/2003 | Leeke et al. |
| 6,587,835 B1 | 7/2003 | Treyz et al. |
| 6,591,085 B1 | 7/2003 | Grady |
| 6,594,723 B1 | 7/2003 | Chapman et al. |
| 6,594,740 B1 | 7/2003 | Fukuda |
| 6,594,774 B1 | 7/2003 | Chapman et al. |
| 6,601,192 B1 | 7/2003 | Bowman-Amuah |
| 6,601,234 B1 | 7/2003 | Bowman-Amuah |
| 6,606,082 B1 | 8/2003 | Zuberec et al. |
| 6,606,660 B1 | 8/2003 | Bowman-Amuah |
| 6,606,744 B1 | 8/2003 | Mikurak |
| 6,609,105 B2 | 8/2003 | Van Zoest et al. |
| 6,615,199 B1 | 9/2003 | Bowman-Amuah |
| 6,615,253 B1 | 9/2003 | Bowman-Amuah |
| 6,618,039 B1 | 9/2003 | Grant et al. |
| 6,622,083 B1 * | 9/2003 | Knockeart et al. .......... 701/202 |
| 6,629,000 B1 | 9/2003 | Moon et al. |
| 6,629,197 B1 | 9/2003 | Bhogal et al. |
| 6,636,242 B2 | 10/2003 | Bowman-Amuah |
| 6,639,584 B1 | 10/2003 | Li |
| 6,640,238 B1 | 10/2003 | Bowman-Amuah |
| 6,640,244 B1 | 10/2003 | Bowman-Amuah |
| 6,640,249 B1 | 10/2003 | Bowman-Amuah |
| 6,640,306 B1 | 10/2003 | Tone et al. |
| 6,671,567 B1 | 12/2003 | Dwyer et al. |
| 6,671,715 B1 | 12/2003 | Langseth et al. |
| 6,671,745 B1 | 12/2003 | Mathur et al. |
| 6,671,818 B1 | 12/2003 | Mikurak |
| 6,675,233 B1 | 1/2004 | Du |
| 6,678,215 B1 | 1/2004 | Treyz |
| 6,681,120 B1 * | 1/2004 | Kim ........................ 455/556.1 |
| 6,694,200 B1 | 2/2004 | Naim |
| 6,697,824 B1 | 2/2004 | Bowman-Amuah |
| 6,697,944 B1 | 2/2004 | Jones et al. |
| 6,704,394 B1 | 3/2004 | Touma et al. |
| 6,707,889 B1 | 3/2004 | Saylor et al. |
| 6,708,086 B2 | 3/2004 | Richard |
| 6,715,145 B1 | 3/2004 | Bowman-Amuah |
| 6,721,489 B1 | 4/2004 | Benyamin et al. |
| 6,721,710 B1 | 4/2004 | Lueck |
| 6,725,022 B1 | 4/2004 | Clayton et al. |
| 6,728,531 B1 | 4/2004 | Lee |
| 6,731,625 B1 | 5/2004 | Eastep et al. |
| 6,741,980 B1 | 5/2004 | Langseth et al. |
| 6,742,015 B1 | 5/2004 | Bowman-Amuah |
| 6,754,181 B1 | 6/2004 | Elliott et al. |
| 6,760,916 B2 | 7/2004 | Holtz et al. |
| 6,772,212 B1 | 8/2004 | Lau et al. |
| 6,788,528 B2 | 9/2004 | Enners et al. |
| 6,791,907 B2 | 9/2004 | Berhan |
| 6,792,086 B1 | 9/2004 | Saylor et al. |
| 6,792,263 B1 | 9/2004 | Kite |
| 6,792,615 B1 | 9/2004 | Rowe et al. |
| 6,832,316 B1 | 12/2004 | Sibert |
| 6,842,906 B1 | 1/2005 | Bowman-Amuah |
| 6,845,398 B1 | 1/2005 | Galensky et al. |
| 6,862,357 B1 | 3/2005 | Albus et al. |
| 6,888,927 B1 | 5/2005 | Cruickshank et al. |
| 6,888,929 B1 | 5/2005 | Saylor et al. |
| 6,892,067 B1 | 5/2005 | Sharma et al. |
| 6,901,067 B1 | 5/2005 | Kalavade |
| 6,904,449 B1 | 6/2005 | Quinones |
| 6,907,112 B1 | 6/2005 | Guedalia et al. |
| 6,909,708 B1 | 6/2005 | Krishnaswamy et al. |
| 6,915,272 B1 | 7/2005 | Zilliacus |
| 6,917,923 B1 | 7/2005 | Dimenstein |
| 6,956,833 B1 | 10/2005 | Yukie et al. |
| 6,963,783 B1 | 11/2005 | Bi et al. |
| 6,963,784 B1 | 11/2005 | Gibbs |
| 6,975,835 B1 | 12/2005 | Lake et al. |
| 6,978,127 B1 | 12/2005 | Bulthuis et al. |
| 6,990,208 B1 | 1/2006 | Lau et al. |
| 6,990,334 B1 | 1/2006 | Ito |
| 7,013,151 B2 | 3/2006 | Hirokawa |
| 7,020,704 B1 | 3/2006 | Lipscomb et al. |
| 7,058,376 B2 | 6/2006 | Logan et al. |
| 7,065,342 B1 | 6/2006 | Rolf |
| 7,085,710 B1 | 8/2006 | Beckert et al. |
| 7,120,462 B2 | 10/2006 | Kumar |
| 7,123,936 B1 | 10/2006 | Rydbeck et al. |
| 7,124,101 B1 | 10/2006 | Mikurak |
| 7,130,807 B1 | 10/2006 | Mikurak |
| 7,145,898 B1 | 12/2006 | Elliott |
| 7,149,772 B1 | 12/2006 | Kalavade |
| 7,200,357 B2 | 4/2007 | Janik et al. |
| 7,209,943 B1 | 4/2007 | Ching et al. |
| 7,219,123 B1 | 5/2007 | Fiechter et al. |
| 7,321,923 B1 | 1/2008 | Rosenberg et al. |
| 7,324,833 B2 | 1/2008 | White et al. |
| 7,339,993 B1 | 3/2008 | Brooks |
| 7,343,414 B2 | 3/2008 | Lipscomb et al. |
| 7,346,687 B2 | 3/2008 | Lipscomb et al. |
| 7,379,541 B2 | 5/2008 | Iggulden et al. |
| 7,437,485 B1 | 10/2008 | Kruglikov et al. |
| 7,440,772 B2 | 10/2008 | White et al. |
| 7,444,353 B1 | 10/2008 | Chen |
| 2001/0042107 A1 | 11/2001 | Palm |
| 2002/0023028 A1 | 2/2002 | Quarendon |
| 2002/0026442 A1 | 2/2002 | Lipscomb et al. |
| 2002/0046084 A1 | 4/2002 | Steele et al. |
| 2002/0058475 A1 | 5/2002 | Patsiokas |
| 2002/0060701 A1 | 5/2002 | Naughton et al. |
| 2002/0072818 A1 | 6/2002 | Moon et al. |
| 2002/0144271 A1 | 10/2002 | Behagen et al. |
| 2003/0008646 A1 | 1/2003 | Shanahan |
| 2003/0105718 A1 | 6/2003 | Hurtado et al. |
| 2003/0126335 A1 | 7/2003 | Silvester |
| 2003/0163486 A1 | 8/2003 | Van Der Meulen |
| 2003/0215102 A1 | 11/2003 | Marlowe |
| 2004/0078274 A1 | 4/2004 | Aarnio |
| 2004/0151327 A1 | 8/2004 | Marlow |
| 2004/0210765 A1 | 10/2004 | Erickson |
| 2005/0010633 A1 | 1/2005 | Shanahan |
| 2005/0049002 A1 | 3/2005 | White et al. |

| | | |
|---|---|---|
| 2005/0054379 A1 | 3/2005 | Cao et al. |
| 2005/0096018 A1 | 5/2005 | White et al. |
| 2005/0282600 A1 | 12/2005 | Paradice |
| 2006/0039263 A1 | 2/2006 | Trotabas |
| 2006/0080741 A1 | 4/2006 | Nair |
| 2006/0094349 A1 | 5/2006 | Slesak et al. |
| 2006/0105804 A1 | 5/2006 | Kumar |
| 2006/0206493 A1 | 9/2006 | Lipscomb et al. |
| 2007/0150963 A1 | 6/2007 | Lee et al. |

FOREIGN PATENT DOCUMENTS

| | | |
|---|---|---|
| CN | 1218258 A | 6/1999 |
| CN | 1218258 A | 6/1999 |
| DE | 4431070 | 3/1996 |
| DE | 19 651 308 A1 | 10/1996 |
| DE | 102 05 641 A 1 | 2/2002 |
| DE | 44 31 070 B4 | 7/2004 |
| DE | 20 2004 013 65 | 12/2004 |
| EP | 333330 A1 * | 9/1989 |
| EP | 0 569 343 A1 | 10/1993 |
| EP | 0569243 | 11/1993 |
| EP | 0 661 676 A1 | 12/1994 |
| EP | 0 675 341 A1 | 4/1995 |
| EP | 0675341 | 10/1995 |
| EP | 0 771 686 A2 | 7/1997 |
| EP | 0 920 016 A2 | 2/1999 |
| EP | 0 918 408 A2 | 5/1999 |
| EP | 0 982 732 A1 | 1/2000 |
| EP | 0982732 A1 | 1/2000 |
| EP | 1 146 674 A2 | 10/2001 |
| JP | 59085599 | 5/1984 |
| JP | 63-136828 | 6/1988 |
| JP | 63136828 | 6/1988 |
| JP | 1018712 | 1/1989 |
| JP | 2-301330 | 12/1990 |
| JP | H4-261576 | 9/1992 |
| JP | 5077679 | 3/1993 |
| JP | 5-294250 | 11/1993 |
| JP | 6-187597 | 7/1994 |
| JP | 6289118 | 10/1994 |
| JP | 6294659 | 10/1994 |
| JP | 7036382 | 2/1995 |
| JP | 07-129895 | 5/1995 |
| JP | 07-146155 | 6/1995 |
| JP | 7-262493 | 10/1995 |
| JP | 7270171 | 10/1995 |
| JP | 8-79814 | 3/1996 |
| JP | H08-79814 | 3/1996 |
| JP | 8-110231 | 4/1996 |
| JP | 9-50282 | 2/1997 |
| JP | 9-61514 | 3/1997 |
| JP | 9-74580 | 3/1997 |
| JP | 10-103966 | 4/1998 |
| JP | 10-143349 | 5/1998 |
| JP | 10-149182 | 6/1998 |
| JP | 10-173737 | 6/1998 |
| JP | 1998-052033 | 9/1998 |
| JP | 3056721 | 12/1998 |
| JP | 11-68685 | 3/1999 |
| JP | 11-73192 | 3/1999 |
| JP | 1168685 | 3/1999 |
| JP | 2901445 | 3/1999 |
| JP | 11-96735 | 4/1999 |
| JP | 11-143791 | 5/1999 |
| JP | 1999-0033393 | 5/1999 |
| JP | 1999-0042565 | 6/1999 |
| JP | 11-219580 | 8/1999 |
| JP | 11-068685 | 9/1999 |
| JP | 11-242686 | 9/1999 |
| JP | H11-242686 | 9/1999 |
| JP | 11219580 A | 10/1999 |
| JP | 11-317061 | 11/1999 |
| JP | H11-317061 | 11/1999 |
| JP | 2000-0001465 | 1/2000 |
| JP | 2000-66974 | 3/2000 |
| JP | 2001-0009302 | 2/2001 |
| JP | 2001-0028354 | 4/2001 |
| JP | 2001-128280 | 5/2001 |
| JP | 10-356742 | 10/2002 |
| JP | 3890692 | 12/2006 |
| JP | 2007-207257 | 8/2007 |
| KR | 10-1997-0016743 | 4/1997 |
| KR | 20-1997-0012254 | 5/1997 |
| KR | 0142256 | 3/1998 |
| KR | 2019990022030 U | 6/1999 |
| KR | 1999-0048723 | 7/1999 |
| KR | 1999-0055970 | 7/1999 |
| KR | 1999-0073234 | 10/1999 |
| KR | 100242563 B1 | 10/1999 |
| KR | 2000-0001465 | 1/2000 |
| KR | 20000036680 | 7/2000 |
| KR | 10-0356742 | 10/2002 |
| WO | WO 94/18763 | 8/1994 |
| WO | WO 96/04724 | 2/1996 |
| WO | WO 96/07110 | 3/1996 |
| WO | WO 97/13657 | 4/1997 |
| WO | WO 98/21672 | 5/1998 |
| WO | WO 98/19480 | 7/1998 |
| WO | WO 98/33102 | 7/1998 |
| WO | WO 98/47252 | 10/1998 |
| WO | WO 99/06910 | 2/1999 |
| WO | WO 99/18518 | 4/1999 |
| WO | WO 99/23856 | 5/1999 |
| WO | WO 99/28897 | 6/1999 |
| WO | WO 99/35009 | 7/1999 |
| WO | WO 99/43136 | 8/1999 |
| WO | 11-317061 | 11/1999 |
| WO | WO 99/12152 | 11/1999 |
| WO | WO 00/07849 | 2/2000 |
| WO | WO 00/38340 | 6/2000 |
| WO | WO 00/54187 | 9/2000 |
| WO | WO 00/60450 | 10/2000 |
| WO | WO 00/70523 | 11/2000 |
| WO | WO 00/79372 A1 | 12/2000 |

OTHER PUBLICATIONS

Declaration Of John M. Jackson in Support Of Defendants' Motion To Stay Litigation Pending Reexamination, Filed on Jan. 12, 2009, pp. 1-2.
Exhibit B to Defendants' Motion to Stay Litigation Pending Reexamination (Ex Parte Reexamination Communication Transmittal Form and Order Granting Request For Ex Parte Reexamination, Issued by the U.S. Patent and Trademark Office on Dec. 12, 2008, pp. 1-16).
Exhibit C to Defendants' Motion to Stay Litigation Pending Reexamination (Affinity Labs of Texas website, http://www.afflabstx.com/, printed on Dec. 29, 2008, Filed on Jan. 12, 4 pages total).
Exhibit D to Defendants' Motion to Stay Litigation Pending Reexamination (United States Patent and Trademark Office, Ex Parte Reexamination Filing Data, Sep. 30, 2008, pp. 1-2).
*Affinity Labs of Texas, LLC, Plaintiff,* v. *BMW North America, LLC, et al.*, Civil Action No. 9:08-cv-00164 RC (Defendants' Joint Motion to Stay Litigation Pending Reexamination, Filed on Jan. 13, 2009, pp. 1-8).
Proposed Order on Defendants' Motion To Stay Litigation Pending Reexamination, Filed on Jan. 13, 2009, 1 page total.
Request For Ex Parte Reexamination Under 35 U.S.C. §302 for U.S. Patent No. 7,324,833, Filed on Nov. 7, 2008 (pp. 1-21).
Richard Menta, "1200 Song MP3 Portable Is a Milestone Player," Jan. 11, 2000, pp. 1-3.
J. Braunstein, "Airbag Technology Takes Off," Automotive & Transportation Interiors, Aug. 1996, p. 16.
I. Adcock, "No Longer Square," Automotive & Transportation Interiors, Aug. 1996, pp. 38-40.

M. Krebs, "Cars That Tell You Where to Go," The New York Times, Dec. 15, 1996, section 11, p. 1.
L. Kraar, "Knowledge Engineering," Fortune, Oct. 28, 1996, pp. 163-164.
S. Heuchert, "Eyes Forward: An ergonomic solution to driver information overload," Society of Automobile Engineering, Sep. 1996, pp. 27-31.
"OnStar" brochure by General Motors Corp., 1997.
Sun Microsystems, Inc., "Why Jini Now?", Aug. 1, 1998, pp. 1-14.
Sun Microsystems, Inc., "What is Jini?",—Summary.
Clohessy, Kim, Object Technology, Inc., Virtual Machine Technology: Managing Complexity and Providing Portability for Embedded Systems, 2001, pp. 58-60.
Mobile GT, "The Architecture for Driver Information Systems."
U.S. Patent and Trademark Office, Order Granting/Denying Request For Ex Parte Reexamination dated Dec. 19, 2008 for U.S. Patent No. 7,324,833 (request granted), pp. 1-13.
*Affinity Labs of Texas, LLC, Plaintiff,* v. *BMW North America, LLC, et al., Defendants*, Civil Action No. 9:08-cv-164, Order Denying Defendants' Motion To Stay, Filed Feb. 20, 2009, pp. 1-9.
The United States Patent and Trademark Office, Office Action Mailed Aug. 5, 2009, in a related application.
"Request for Inter Partes Reexamination Of U.S. Patent No. 7,324,833 Pursuant to 37 CFR 1.915," Requestor: Volkswagen Group of America, Inc., Filed on Aug. 21, 2009, pp. 1-61 with Certificate of Mailing, and Claim Charts A-HH.
Yamaha Corporation, "Yamaha Music Sequencer, QY70, Owner's Manual," Chapters 1-11, 1997.
Multi Technology Equipment, "Neo Car Jukebox, Installation and Instruction Manual," pp. 1-30.
Hewlett Packard, "HP Jornada 430/430se Palm-Size PC, User's Guide," Edition 1, 1999, pp. 1-151.
NEC, "NEC MobilePro 750C, User's Guide," 1998, pp. 1-83.
Microsoft, "Palm PC User's Guide," Microsoft Windows CE, pp. 1-39.
Palm PC User'S Guide, "Chapter 6, Information Backup and Exchange," pp. 69-148.
MPMan, "User's Guide, The Portable MP 3player using the flash memory and SmartMedia card," 1997, pp. 1-35.
Cover Sheet, www.mpman.com, 1 page.
Smart Media Card Slot Diagram, 1 page.
MP Man F20 Logo, 1 page.
MPMan, "User's Guide, The portable MP3 player using the flash memory with variety features including the voice recording, phone/memo browsing, etc.," 1997, pp. 1-47.
Smart Media card diagram and install instructions, pp. 1-4.
Anand Lal Shimpi, Empeg, Ltd., "MP3 meets Car Audio: Empeg Mark II in-dash Car MP3 Player," Sep. 18, 2000, pp. 1-17.
Peter Clarke, EE Times, "Engineers drive craze for MP3 audio players," Feb. 5, 1999, pp. 1-4.
Rio Car Dot Org Geek Guide, "empeg car Mk. 1," Feb. 21, pp. 1-4.
Hugo Fiennes, Rio Car Dot Org Geek Guide, "MP3 Mobile," Feb. 21, pp. 1-4.
Rio Car Dot Org, Frequently Asked Questions, pp. 1-16.
Diamond Multimedia Systems, Inc., "Rio PMP300 User's Guide," 1998, pp. 1-27.
Stephen J. Buckley, et al., "The Car as a Peripheral, Adapting a Portable Computer to a Vehicle Intranet," SAE Technical Paper Series, 98C030, Oct. 19-21, 1998, pp. 1-14.
"The MP3 Mobile," Apr. 8, 1998, pp. 1-13.
12-Volt Business & Technology Solutions, AutoMedia, "How the Intelligent Data Bus will impact the way you do business," Nov. 1998, pp. 1-2.
Press Release, "Creative Labs Launches Nomad Portable MP3 Players," Apr. 15, 1999, pp. 1-5.
BMW, "Betriebsanleitung Bordmonitor mit Navigation und TV," 1995, pp. 1-82.
BMW, "Owner's Manual, On-board monitor with navigation system," 1996, pp. 1-81.
Transperfect/Translations, "True and accurate translation of the 1995 BMW Manual, from German into English," Aug. 16, 2005, pp. 1-80.
Heinz Sodeikat, "Euro-Scout is facing the German 1994 Market," 1994, pp. 551-556.
Pictures of car navigation systems in a car dashboard, pp. 1-11.
BMW, "The BMW On-Board Navigation System—Technology Takes a Remarkable Turn," 2005, pp. 1-9.
Oldsmobile, "1991 Toronado/Trofeo User's Guide," 1991, pp. 1-41.
Yepp, "Digital Sounds—yepp—YP-E32/E64102-291," Oct. 23, 1999, pp. 1-.46.
U.S. Appl. No. 60/167,179, entitled "System, Method, and Device for Playing Recorded Music on a Wireless Communications Device," by Devon A. Rolf, filed Nov. 23, 1999, pp. 1-48.
Microsoft, "Getting Started, Microsoft Windows 98, For distribution with a new PC only," 1998, pp. 1-145.
PR Newswire, "Alpine Announces Fall Release of Interface Adapter That Enables iPod Control and Playback from In-Vehicle Sound Systems," Jul. 7, 2004, pp. 1-2.
Ha-Young Park, The Customer Times, "Portable Computer Music, MP3 File and MP3 Player rise as the Next Generation Audio Format," May 1999, pp. 1-2.
"MP3 Players Introduced in the Korean IT Magazines," 1998-1999, pp. 1-15.
MPMan, "MP-F20, User's Guide, Portable MP3 player using the flash memory and a Memory card," [ages 1-16.
PR Newswire Association, Inc., "Delphi's Communiport(R) Technology for Tomorrow, Today Demonstrated at Frankfurt Auto Show," Sep. 15, 1999, pp. 1-8.
Crain Communications, Inc., "Products," Agilent Technologies Press Release, Feb. 21, 2000, pp. 1-6.
The Washington Times, LLC, John Hanan, Dallas Morning News, "Cars add computer, audiovisual gear," Jan. 14, 2000, pp. 1-3.
Daniel Kumin, Stereo Review, "Jukebox Heaven," Jan. 1999, pp. 64-71.
Audio, "Anthem Five-Channel Amp," Jul./Aug. 1999, p. 15.
Sony webpages in Japanese, "Portable Mini Disc Player MD Recorder," Jul. 21, 1996, pp. 1-5.
Sony, "MD Walkman Operating Instructions—MZ-R4ST," 1996, pp. 1-64.
Sony, "MD Walkman Operating Instructions—MZ-R5ST," 1997, pp. 1-79.
Stereo Review, "New Products," Jun. 1998, 1 page.
Factiva, Hardware Review, "Lost in the Supermarket," 2009, pp. 1-3.
Sony webpages in Japanese, "Portable Mini Disc Player MD Recorder," Oct. 21, 1999, pp. 1-63.
Jamie Sorcher, Stereo Review, "New for the Road," May 1998, 2 pages.
Sony, "MD Walkman Operating Instructions—MZ-R55," 1998, pp. 1-42.
John Whitters, The Advertiser, "Is the cassette doomed?" Jul. 16, 1998, pp. 1-2.
George Cole, Financial Times, "Listen with your eyes: A new music CD format supplies textual information," Oct. 23, 1997, pp. 1-2.
Dana J. Parker, Standard Deviations, "CD-TEXTra! Read all about it!", Oct. 1996, pp. 1-2.
Mobile Electronics, "Down the Road," Jul. 2004, pp. 1-2.
Alpine, "Interface Adapter for iPod KCA-420i—Owner's Manual," 44 pages total.
PR Newswire, "Alpine Announces Fall Release of Interface Adapter That Enables iPod Control and Playback From In-Vehicle Sound Systems," Jul. 7, 2004, 2 pages total.
Amy Gilboy, Mobile Electronics, "Apple's iPod Seen Transforming Car Audio Business," 1 page.
Greg Borrowman, The Sydney Morning Herald, "Philips Releases Its Latest DVD," 1999, 2 pages total.
JVC, "Audio/Video Control Receiver, RX-668VBK, Instructions," pp. 1-43.
Sony webpages in Japanese, "Portable MD Recorder," Oct. 1997, 5 pages total.
Sony, "Walkman MZ-R50 Recorder," Oct. 1997 7 pages total.
Sony, "MD Walkman MZ-R55," Oct. 10, 1998, 6 pages total.
Von Herbert Pauler, Funkschau, "Kopierschutz fur MP3-Audio," 1999, 9 pages total.
English Summary, "A device for remotely controlling a car device for playing mp3 files is disclosed . . . ", 1 page.
Franklin N. Tessler, Macworld, "Mobile MAC, Highway Fidelity," Jun. 2004, pp. 1-3.

Barry Collins, The Sunday Times, "High-class high-tech—Buyer's guide," 2001, 2 pages total.
Peter Familari, Herald-Sun, "Clever Deck—CD and mini-disc combination," 1998, 1 page.
JVC, "MD-CD Combination Deck, XU-301BK, Instructions," pp. 1-59.
Amy Gilroy, Mobile Electronics, "OEM Integrators Embrace iPod's Success," 1 page.
JVC, "Portable Minidisc Recorder, XM-R700SL, Instructions," pp. 1-24.
Rio Car, "Car Toy Sole Retailer for Rio Car," May 28, 2001, 1 page.
Amy Gilroy, Twice, "Panasonic Ships First SD MP3," Dec. 4, 2000 1 page.
Twice, "PhatNoise Readies MP3," Nov. 5, 2001, 1 page.
Kevin Savetz, The Washington Post, "Putting Your MP3 Collection in Drive (Final Edition)," Aug. 10, 2001, pp. 1-3.
Twice, "Study Sees Retail Opportunities For Mobile Multimedia," vol. 14, Issue 15, Jun. 28, 1999, pp. 1-2.
Japanese Webpage, www.kcalgo.kr/jsp/main.jsp, 1 page.
Japanese Webpage, www.kca.go.kr—Brochure Free—Microsoft Internet Explorer, 1 page.
Stephen Kempainen, EDN Access for Design, by Design "In-car computing gets personal," Aug. 17, 1998, pp. 1-7.
Japanese Website, MM MPMANIA.com, http:/mpmania, x-y.net/bbs/zboard.php?id=products&keyword=1998, 1 page.
Japanese document regarding MP3, May 1999, 1 page.
MPMan, "The portable MP3 player using the Flash Memory and Memory card—MP-F20," in Japanese, pp. 1-34.
Japanese Website, MM MPMANIA.com, http:/mpmania, x-y.net/bbs/view.php?id=products&page=1&sn1=&divpage, 1 page.
www.mpman.com, "MP-F30, User's Guide," pp. 2-47.
Mark Moeller, Computing Unplugged Magazine, "Software Review, New software products for the Auto PC," 1999-2009, Zatz Publishing, pp. 1-4.
Mark Moeller, Computing Unplugged Magazine, "Auto PC Power, A survey of resources for Auto PC owners," 1999-2009, Zatz Publishing, pp. 1-5.
Mark Moeller, Computing Unplugged Magazine, "Auto PC Power, A look at the first year of the Auto PC with Microsoft," 1999-2009, Zatz Publishing, pp. 1-5.
Mark Moeller, Computing Unplugged Magazine, "Auto PC Power, Next generation AutoPCs make a big debut at CES," 1999-2009, Zatz Publishing, pp. 1-6.
Mark Moeller, Computing Unplugged Magazine, "Programming Power, Getting started developing software for the Auto PC," 1999-2009, Zatz Publishing, pp. 1-5.
Mark Moeller, Computing Unplugged Magazine, "Behind the Scenes, The AutoPC: Vision vs. Reality," 1999-2009, Zatz Publishing, pp. 1-7.
Yamaha Corporation, "QY Data Filer—Owner's Manual," pp. 1-250, 1997.
*Affinity Labs of Texas, LLC, Plaintiff, v. BMW North America, LLC, et al., Defendants*, C.A. No. 9:08-cv-00164-RC, Affinity's Infringement Contentions, with Infringement Chart Exhibits A-G.
*Affinity Labs of Texas, LLC, Plaintiff, v. Alpine Electronics of America, Inc., et al., Defendants*, C.A. No. 9:08-cv-00171-RC, Affinity's Infringement Contentions, with Infringement Chart Exhibits A-1 to G.
*Affinity Labs of Texas, LLC, Plaintiff, v. Dice Electronics, LLC, et al., Defendants*, C.A. No. 9:08-cv-00171-RC, Affinity's Infringement Contentions, with Infringement Chart Exhibits A-C.
*Affinity Labs of Texas, LLC, Plaintiff, v. BMW North America, LLC. et al, Defendants*, Case No. 9:08-cv-00164-RC, Defendant Volkswagen Group of America, Inc's Invalidity Contentions, pp. 1-346.
*Affinity Labs of Texas, LLC, Plaintiff, v. Dice Electronics, LLC., Defendants*, Case No. 9:08-cv-00163-RC; *Affinity Labs of Texas, LLC, Plaintiff, v. Hyundai Motor America, et al., Defendants*, Case No. 9:08-cv-00164-RC; *Affinity Labs of Texas, LLC, Plaintiff, v. JVC Americas Corp., Kenwood USA Corporation, Defendants*, Case No. 9:08-cv-00171-RC, Defendant's Joint Invalidity Contentions and Production of Documents Pursuant to Patent Rules 3-3 and 3-4(b), pp. 1-23 and Exhibits A, B1-B34, C and D.

U.S. Patent and Trademark Office, Issue Notification in U.S. Appl. No. 10/947,754, 1 page.
R. Lind, et al. "The Network Vehicle—A Glimpse into the Future of Mobile Multi-Media," Sep. 1999, pp. 27-32.
*Affinity Labs of Texas, LLC, Plaintiff, v. Apple, Inc., Defendant*, C.A. No. 9:09-cv-00047-RC (Eastern District of Texas), Complaint (pp. 1-7), with Exhibits A, B and C, Filed Mar. 24, 2009, 76 pages in total.
Mark Moeller, Computing Unplugged Magazine, "Product Preview, A Survey of Auto PC 2.0 for software developers," 1999-2009, Zatz Publishing, pp. 1-7.
Mark Moeller, Computing Unplugged Magazine, "AutoPC Update, Auto PC/Windows CE for Automotive news bites," 1999-2009, Zatz Publishing, pp. 1-4.
Claim Chart for KR19990033393, Claim 17 of U.S. Patent No. 7,324,833, pp. 1-3.
RIO500, Getting Started Guide for Windows 98 and Macintosh OS 8.6, pp. 1-2.
Norbert A. Streitz, et al., "Dolphin: Integrated Meeting Support Across Local And Remote Desktop Environments and LiveBoards," Integrated Publication and Information Systems Institute, 1994, pp. 345-358.
Leo Degen, et al., "Working with Audio: Integrating Personal Tape Recorders and Desktop Computers," May 3-7, 1992, pp. 413-418.
H.S. Jun Gibee, "A Virtual Information Desk On The Internet," University of Ulsan, Sep. 1999, pp. 265-268.
Steve Whittaker, et al., "TeleNotes: Managing Lightweight Interactions in the Desktop," Lotus Development Corporation, Jun. 1997, pp. 137-168.
R.M. Crowder, et al., "Integration of Manufacturing Information Using Open Hypermedia," Computer in Industry, 1999, pp. 31-42.
Tomas Bostrom, et al., "Mobile Audio Distribution," Royal Institute of Technology, 1999, pp. 166-172.
Alex Poon, et al., Xerox Disclosure Journal, vol. 19, No. 2, "Gestural User Interface Technique for Controlling the Playback of Sequential Media," Mar./Apr. 1994, pp. 187-190.
Deb Kumar Roy, "NewsComm: A Hand-Held Device for Interactive Access to Structured Audio," Massachusetts Institute of Technology, Jun. 1995, pp. 1-12.
Victoria Bellotti, et al., "Walking Away from the Desktop Computer: Distributed Collaboration and Mobility in a Product Design Team," 1996, pp. 209-218.
Upul Obeysekare, et al., "The Visual Interactive Desktop Laboratory," Jan.-Mar. 1997, pp. 63-71.
Asim Smailagic, et al., "MoCCA: A Mobile Communication and Computing Architecture," Institute for Complex Engineered Systems, pp. 1-8.
Sui-Meng Poon, et al., "Integration of Value-Added Audio Playback Capacity Into Computer Network," Nanyang Technological University, 1995, pp. 632-636.
Erdal Paksoy, et al., "A variable-rate celp coder for fast remote voicemail retrieval using a notebook computer," DSPS R&D Center, Texas Instruments, 1997, pp. 119-124.
Jeffrey A. Davis, "Use of Personal Computers in Satellite Command and Control Systems," Raytheon Systems Company, Oct. 24, 1999, pp. 283-291.
Niki Davis, "Remote Teaching Via ISDN2 And Desktop Conferencing,"Exeter University School of Education, pp. 1-3.
A Chan, et al., "The PEP-II Project-Wide Database," Stanford University, 1996, pp. 840-842.
Krishna Bharat, et al., "Migratory Applications," Springer Berlin, vol. 1222, 1997, pp. 1-21.
EMPEG Car, "MP3 in your dash," Digital Audio Player User Guide, pp. 1-50.
Microsoft, "Getting Started Microsoft. Windows. 98" Second Edition, 1998, pp. 1-138.
Saul Greenberg, "PDAs and Shared Public Displays: Making Personal Information Public, and Public Information Personal," University of Calgary, Mar. 1999, pp. 1-11.
Naohiko Kohtake, et al., "InfoStick: an interaction device for Inter-Appliance Computing," Keio University, pp. 1-15.
Hewlett Packard, User's Guide, HP Jornada 420, Palm-Size PC, pp. 1-75.

Microsoft, "Introducing Microsoft Windows 95—Certificate of Authenticity," 1995, pp. 1-117.
Sony, "New Technical Theory for Servicing, MZ-R5ST Operation Manual," pp. 1-44.
Richard C. Davis, et al., "A Framework for Sharing Handwritten Notes," 1998, pp. 119-120.
Krishna A. Bharat, et al., "Migratory Applications," UIST '95, Nov. 14-17, 1995, pp. 133-142.
Brad A. Myers, "Collaboration Using Multiple PDAs Connected To A PC," Carnegie Mellon University, 1998, pp. 385-294.
Richard C. Davis, et al., "NotePals: Lightweight Note Sharing by the Group, for the Group," May 15-20, 1999, pp. 338-345.
Jun Rekimoto, et al., "Augmented Surfaces: A Spatially Continuous Work Space for Hybrid Computing Environments," May 15-20, 1999, pp. 378-385.
Dan R. Olsen, Jr., "Interacting with Chaos," Sep. and Oct. 1999, pp. 42-54.
Scott Robertson, et al., "Dual Device User Interface Design: PDAs and Interactive Television," Apr. 13-18, 1996, pp. 79-86.
Symantec Corporation, "pcANYWHERE32 User's Guide," 1993-1997, pp. 1-216.
Krishna Bharat, et al., Migratory Applications, "Mobile Object Systems Towards the Programmable Internet," Springer Berlin/Heidelberg, vol. 1222/11997, 1997, pp. 1-134.
Diamond Multimedia Systems, Inc., "Rio PMP300, User's Guide," 1998, pp. 1-27.
Sony, "Portable MiniDisc Recorder, Operating Instructions, MZ-R55," 1998, pp. 1-42.
Norbert A. Streitz, et al., "i-Land: An Interactive Landscape for Creativity and Innovation," Proceedings of the ACM Conference on Human Factors in Computing Systems, May 15-20, 1999, pp. 120-127.
Norbert A. Streitz, et al., "Roomware for Cooperative Buildings: Integrated Design of Architectural Spaces and Information Spaces," pp. 1-20.
Direct Cable Connection screen shot, "B1U6U4," 10 pages total.
Direct Cable Connection screen shot, 10 pages total.
IBM, "WordPad z50 Cradle Option—User's Guide," 1990, pp. 1-18.
IBM Mobile Systems, "WorkPad z50 Mobile Companion (2608-1Ax), Hardware Maintenance Manual," Mar. 1999, pp. 1-77.
Kevin Jost, Automotive Engineering International, "The car as a mobile-media platform," May 1998, pp. 49-53.
Microsoft Corporation, "Windows CE 2.1 Technical Articles, Developing Applications for an Auto PC," Jun. 1999, pp. 1-13.
InfoGation Corporation, "InfoGation Corp. Introduces Software Applications for Next-Generation Smart Car Systems," Jan. 8, 1998, pp. 1-2.
Business Wire, "ORA Electronics Announces USB-Compatible TelCar Mark VII Begins Shipping First Quarter of 1999," Jan. 6, 1999, pp. 1-2.
ORA USA, "ORA Electronics Patents Telcar Cellular Telephone Interface," Jul. 6, 1998, pp. 1-2.
*Affinity Labs of Texas, LLC (Plaintiff)* v. *BMW North America, LLC, et al.* (Defendants), Civil Action No. 9:08CV164 and *Affinity Labs of Texas, LLC* (Plaintiff) v. *Alpine Electronics of America, Inc., et al.*, Civil Action No. 9:08CV171, Order Construing Claim Terms of United States Patent No. 7,324,833, issued on Dec. 18, 2009, pp. 1-31.
Real Networks, Inc., RealJukebox Plus Manual, 1999, pp. 1-90.
"Universal Serial Bus Specification," Revision 1.1, Sep. 23, 1998, pp. ii-106.
Reply to Office Action Mailed Aug. 5, 2009 in U.S. Appl. No. 90/010,333 of U.S. Patent No. 7,324,833 (along with a Supplemental Reply and Second Supplemental Reply).
Response to Notice of Failure to Comply with Inter Partes Reexamination Request Filing Requirements (37 CFR 1.915(d)) filed on Sep. 22, 2009. Requestor: Volkswagen Group of America, Inc. with Replacement Request for Inter Partes Reexamination of U.S. Patent No. 7,324,833 and Claim Charts A-JJ.
The United States Patent And Trademark Office, Office Action Mailed Nov. 9, 2007 in related U.S. Appl. No. 10/947,755.
*Affinity Labs of Texas, LLC (Plaintiff)* v. *BMW North America, LLC, et al. (Defendants)*, Case No. 9:08-cv-00164-RC, Answer and Counterclaim of Defendant Volkswagen Group of America, Inc., to Third Amendment Complaint, pp. 1-48, filed on Jan. 15, 2010.
*Affinity Labs of Texas, LLC (Plaintiff)* v. *Alpine Electronics of America, Inc., et al. (Defendants)*, Civil Action No. 9:08-cv-171, Order Denying Without Prejudice Defendants' Motion for Summary Judgment, one page, filed on Feb. 25, 2010.
Request for Inter Partes Reexamination of U.S. Patent No. 7,187,947, filed on Nov. 13, 2009, with accompanying Claim Charts.
Request for Inter Partes Reexamination of U.S. Patent No. 7,440,772, filed on Nov. 13, 2009, with accompanying Claim Charts.
Request for Inter Partes Reexamination of U.S. Patent No. 7,324,833, filed on Nov. 13, 2009, with accompanying Claim Charts.
Request for Inter Partes Reexamination of U.S. Patent No. 7,486,926, filed on Nov. 13, 2009, with accompanying Claim Charts.
Request for Inter Partes Reexamination of U.S. Patent No. 7,634,228, filed on Feb. 3, 2010, with accompanying Claim Charts.
Nokia 9110 Communicator User Manual, Copyright 1999.
Sony, "Sony Notebook Computer User Guide PCG-717/719," User Guide, 1997.
AirCard, "Sierra Wireless Announces First Cellular Network Interface Card for Notebook PCs," Jun. 21, 1999.
MusicMatch Internet Music System, "MusicMatch Jukebox Reviews," Mar. 4, 2000, May 8, 1999, Aug. 29, 1999, May 8, 1999, Feb. 4, 1997, Aug. 12, 1999, Jan. 24, 2000, Jan. 25, 2000, Feb. 22, 2000, pp. 1-32.
Bluetooth, "Specification of the Bluetooth System, Profiles," Dec. 1, 1999.
J. Schneidawind, "Big Blue Unveiling," USA Today, Nov. 23, 1992, p. 2B.
Nokia Suomi, "Range of suspension GSM products unveiled: Nokia's innovations offer a new dimension to mobile communication," Mar. 13, 1996, 1 page.
Nokia 9000i User's Manual, Copyright 1995-1997.
FCC Website, "Broadband PCS," available at http://wireless.foc.gov/services/index.htm? job=service_home&id=broadband_pcs (accessed Nov. 9, 2009).
RealNetworks, "RealPlayer plus, RealPlayer 7 Plus User Manual," Copyright 2000, Mar. 6, 2000.
David Pogue, "SoundJam MP Digital Audio System Manual," 1999.
iTunes Wikipedia Page, http://en.wikipedia.org/wiki/ITunes, accessed Jul. 31, 2009.
K. Jost, "The Car as a Mobile-Media Platform," Automotive Engineering International, May 1998, pp. 49-53.
S.K. Kirschner, "Wired Wheels," Popular Science, Mar. 1998, pp. 54-55.
R. Lind, et al., "The Network Vehicle—A Glimpse into the Future of Mobile Multi-Media," 17th AIAA/IEEE/SAE Digital Avionics Sys. Conference Proceedings, Oct. 31 to Nov. 7, 1998, at I21-1 to I21-8.
*Affinity Labs of Texas, LLC*, Plaintiff, v., *BMW North America, LLC, et al.*, Civil Action No. 9:08CV164, *Affinity Labs of Texas, LLC*, Plaintiff, v., *Alpine Electronics of America, Inc.*, et al., Civil Action No. 9:08CV171, Order Construing Claim Terms of U.S. Appl. No. 7,634,228, Filed on May 10, 2010, pp. 1-27.
D. Peters, et al., "Car Multimedia - Mobile Multimedia for the 21st Century," Oct. 5-6, 2000, pp. 1-58.
Stephan Hartwig, et al., "Mobile Multimedia - Challenges and Opportunities Invited Paper," Jun. 19, 2000, pp. 1-12.
John Hanan, "Car Audio Has Come Far since the 8-Track," Knight Ridder/Tribune Business News, Dec. 17, 1999, pp. 1-2.
Business Wire, "Lobjects Announces New Digital Audio Player Technology for the Next-Generation Auto PC," Aug. 4, 1999, pp. 1-2.
Jason Meserve, "Windows Media Player now available for WinCe, (from Microsoft) (Product Announcement)," Network World, Mar. 6, 2000, pp. 1-2.
Business Wire, "'HUM' MP3 Software Turns Windows CE Handheld Computers Into Portable Music Players," May 24, 1999, pp. 1-2.
Chris De Herrera, "Windows CE 2.0 Auto PC Pictures," Chris De Herrera's Windows CE Website, Revised Jan. 11, 1999, pp. 1-3.
John Murray, "Inside Microsoft Windows CE," Microsoft Press, 1998, pp. 1-20.
Compaq, Intel, Microsoft, NEC, "Universal Serial Bus Device Class Definition for Audio Devices," Release 1.0, Mar. 18, 1998, pp. 1-130.

Compaq, Intel, Microsoft, NEC, "Universal Serial Bus Specification," Revision 1.1, Sep. 23, 1998, pp. 1-327.
Vesa, Video Electronics Standards Association, "VESA Plug and Display (P&D) Standard," Version 1, Revision 0, Jun. 11, 1997, pp. 1-109.
*Affinity Labs of Texas*, LLC, Plaintiff, v., *BMW North America, LLC*, et al., Defendants, Case No. 9:08cv-00164-RC, First Amended Answer and Counterclaim of Defendant Volkswagen Group of America, Inc. To Third Amended Complaint, Filed on Apr. 9, 2010, pp. 1-57.
*Affinity Labs of Texas, LLC*, Plaintiff, v., *BMW North America, LLC*, et al., Defendants, Case No. 9:08- cv-00164-RC, Amended Answer and Counterclaim of Defendants Hyundai Motor America, Hyundai Motor Manufacturing Alabama, LLC, and KIA Motors America, Inc. To Plaintiff Affinity Labs of Texas, LLC's Third Amended Complaint, Filed on Apr. 9, 2010, pp. 1-22.
*Affinity Labs of Texas, LLC*, Plaintiff, v., *BMW North America, LLC*, et al., Defendants, Case No. 9:08- cv-00164-RC, Plaintiff's Reply to Amended Answer and Counterclaim of Defendants Hyundai Motor America, Hyundai Motor Manufacturing Alabama, LLC and KIA Motors America, Inc. To Plaintiff Affinity Labs of Texas, LLLC's Third Amended Complaint, Filed on Apr. 27, 2010, pp. 1-7.
*Affinity Labs of Texas, LLC*, Plaintiff, v., *BMW North America, LLC*, et al., Defendants, Case No. 9:08cv-00164-RC, Plaintiffs Reply to First Amended Answer and Counterclaim of Defendant Volkswagen Group of America, Inc. To Third Amended Complaint, Filed on Apr. 27, 2010, pp. 1-7.
Panasonic, "Portable DVD/Video CD/CD Player, Operating Instructions, DVC-L10D," 1998, pp. 1-84.
Clarion Car Audio and Beyond, "1998 Car Audio & Security Product Catalog," 1998, pp. 1-24.
Clarion Car Audio and Beyond, "1999 Car Audio & Security Product," 1999, pp. 1-60.
Jamie Anderson, "Driving our way soon: the e-car," the Times, Nov. 9, 2000, pp. 1-4.
Clarion Auto PC, "Clarion Auto PC Owner's Manual," 1998, pp. 1-177.
Delphi Automotive Systems, "The Personal Productivity Vehicle," 1998, pp. 1-2.
Delphi Delco Electronics Systems, "On-Board Architecture," 1997, pp. 1-2.
Janet Braunstein, "Diversified Software Industries: Enabling digital instrument panels," Jan. 10, 2001, pp. 1-2.
Microsoft PressPass, "Microsoft Previews New Devices Using Windows CE for Automotive 2.0," Jan. 2000, pp. 1-2.
John Townley, "Countdown to Clarion," Automedia, pp. 1-4.
Gina Hertel, "A Voice-Activated Co-Pilot: ICES," Odds & Ends, Jan. 2000, vol. 8, Issue 1, pp. 1-5.
Kami Buchholz, "Diversified Software launches Ivis," Automotive Engineering Online, 2009, one page.
Empeg Car webpage, http:/web.archive.org/web/19990430033318/www.empeg.com/main.html, Apr. 30, 1999, one page.
Clarion AutoPC, "Frequently Asked Questions," 1998, pp. 1-3.
Clarion AutoPC, "Frequently Asked Questions," 1999, pp. 1-9.
Stereophile, "Clarion Debuts World's First Automobile PC/Stereo," Dec. 5, 1998, pp. 1-3.
Steve Whalley, "Peripherals To Go: USB in AutoPC," pp. 1-2.
Gregory L. White, "After AutoPC's Hard Ride, Detroit Tries Rebooting In-Car Computers," The Wall Street Journal, pp. 1-3.
*Affinity Labs of Texas, LLC*, Plaintiff v., *BMW North America, LLC*, et al., Defendants, Civil Action No. 9:08-CV-164, Order Denying Defendant's Motion to Dismiss, Filed on Sep. 2, 2009, pp. 1-7.
U.S. Patent and Trademark Office, Office Action in Inter Partes Reexamination mailed on May 24, 2010, in U.S. Appl. No. 95/001,262.

* cited by examiner

METHOD FOR MANAGING MEDIA

RELATED APPLICATIONS

This application is a continuation of U.S. patent application Ser. No. 10/947,755 (filed Sep. 23, 2004 and now U.S. Pat. No. 7,324,833, to issue Jan. 29, 2008) entitled "System and Method for Connecting a Portable Audio Player to an Automobile Sound System," which is a continuation of U.S. patent application Ser. No. 09/537,812 (filed Mar. 28, 2000 and now U.S. Pat. No. 7,187,947, issued Mar. 6, 2007) entitled "System and Method for Communicating Selected Information to an Electronic Device," the disclosures of which are all hereby incorporated herein by reference in their entirety for all purposes.

FIELD OF THE DISCLOSURE

The present disclosure relates to digitally stored content and, more specifically, to a content delivery system and method.

BACKGROUND

The first commercial radio stations in the United States began operation around 1920. Today, there may be as many as 12,000 radio stations in the United States programming in several distinct formats. When broadcasting their respective signals, these radio stations often use an analog signal, which may be modulated based on frequency or amplitude. Frequency modulated (FM) radio appears to be the dominant entertainment medium while amplitude modulated (AM) radio seems to be a popular outlet for news and information.

Unfortunately, analog radio may be unable to provide the sound quality and consistency that radio listeners desire. As such, several broadcasting related companies have begun to consider a movement to digital radio. Unlike analog radio reception, digital radio reception may be able to provide compact disk (CD) quality sound while remaining virtually immune to interference. Being immune to interference may result in reducing static growls or "multipath" echoes, echoes caused by signal reflections off buildings or topographical features.

Some countries, like Canada and many European countries, may choose to have digital radio operate in a single digital radio band such as the L-band between 1452-1492 megahertz (MHz). This band would allow the reception of both terrestrially and satellite-originated signals. By comparison, FM radio typically operates between 88 and 108 MHz while AM radio typically operates between 0.525 and 1.705 MHz. Neither of these bands allows for easy transmission via satellite.

Canada proposed using the L-Band for digital radio as early as 1992. Several countries throughout the world have since agreed to use the L-Band for digital radio with one notable exception. It appears the United States has chosen not to operate its digital radio within the L-Band. In the United States, the L-Band may already be committed for military uses. Apparently, the United States plans to adopt a system called in-band on-channel, or IBOC, which fits within the AM and FM frequencies.

IBOC technology may offer some advantages over L-Band transmissions. For example, there may be no need for new spectrum allocations. There may be backward and forward compatibility with existing AM and FM systems on both the transmitter and receiver sides, and there may be a low-investment upgrade to digital systems. Unfortunately, a workable IBOC solution is yet to be seen though technology may someday make IBOC digital radio commercially possible.

Even if an IBOC solution becomes commercially available in the United States, IBOC digital radio may suffer from several shortcomings. For example, there may global standardization problems. Though the United States favors IBOC, the European and Canadian communities seem to favor L-Band making the establishment of a global standard difficult.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE DRAWINGS

The conceptual groundwork for the present invention includes wirelessly communicating selective information to an electronic device. According to one aspect, a user may interact with the Internet to select information, such as audio information, and wirelessly communicate the selected information to an electronic device. The electronic device receives the information via a wireless communications network and processes the information accordingly. In a particularized form, a user may select information from an Internet website operable to allow selectivity of audio information such as songs, on-line radio stations, on-line broadcasts, streaming audio, or other selectable information. Upon selecting the audio information, information or data associated with the selected audio information is wirelessly communicated to an electronic device. The electronic device may then be used to process the selected audio information. In this manner, a user may receive selective audio information via a wireless electronic device.

In one form, the electronic device may be operable to communicate with an individual's automobile audio system. A user may select audio information utilizing a personal computer with access to a website operable to display selectable audio information. The selected audio information may then be wirelessly communicated to the electronic device associated with an automobile's audio system. Therefore, upon receiving the selected audio information, a user may access and play the received audio information utilizing the electronic device in association with the automobile's audio system.

The present invention is not limited to communicating only audio information. One skilled in the art can appreciate that other types of information, such as video, textual, etc. may be communicated utilizing the systems and methods disclosed herein without departing from the spirit and scope of the present invention. Additionally, it will be understood that information may be formatted in a plurality of ways at different phases of communication without loosing the underlying content of the selected information. For example, an audio file may be formatted, segmented, compressed, modified, etc. for the purpose of providing or communicating the audio invention. Therefore, the term "audio information" or "information" is used in a general sense to relate to audio information in all phases of communication.

Figure 1:
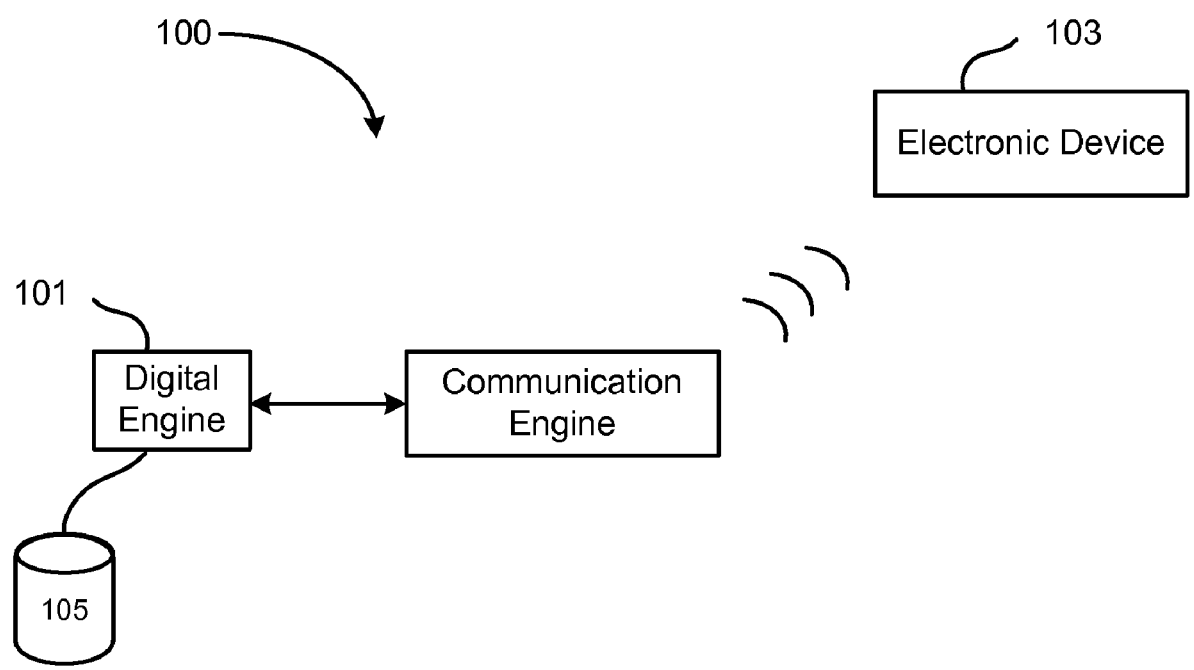
FIG. 1 depicts a general system for wirelessly communicating selective information to an electronic device in accordance with one aspect of the present invention.

FIG. 1 depicts a general system for wirelessly communicating selective information to an electronic device in accordance with one aspect of the present invention. The system, illustrated generally at 100, includes a digital engine 101 coupled to a communications engine 102. Communications engine 102 is remotely coupled to an electronic device 103. Digital engine 101 may be directly or indirectly coupled to storage device 105 operable to store information. Digital engine 101 maintains information or data associated with selected information in a digital format. The information may be stored within storage device 105 or other storage devices operable to maintain data or information associated with the selected information.

Communications engine 102 is communicatively coupled to digital engine 101 and operable to wirelessly communicate the selected information to electronic device 103. During operation, audio information may be selected by a user utilizing a personal computer or other devices operable to communicate with an information network. Digital engine 101 is operable to maintain information associated with the selected audio information. For example, the information could be several songs or titles configured as an audio file and formatted in a digital format such as an MP3 file, wave file, etc. The maintained information may also be a reference to a network location where an audio file may be stored, a network location where a network broadcast of audio information may be located, etc. or other network locations having information associated with the selected audio information. Therefore, digital engine 101 may maintain a plurality of different types of information or data associated with the selected audio information.

System 100, utilizing communication engine 102, may wirelessly communicate data or information associated with the selected audio information to electronic device 103 thereby providing wireless communication of selected information to an electronic device operable to receive wireless communications. In one embodiment, digital engine 101 may be used in association with an Internet website configured to provide access to selectable information. The Internet website operably associated with digital engine 101 allows a user to select information to be wirelessly communicated to electronic device 101 utilizing a network environment. The Internet website may include several different types of information related to audio information.

Figure 4:
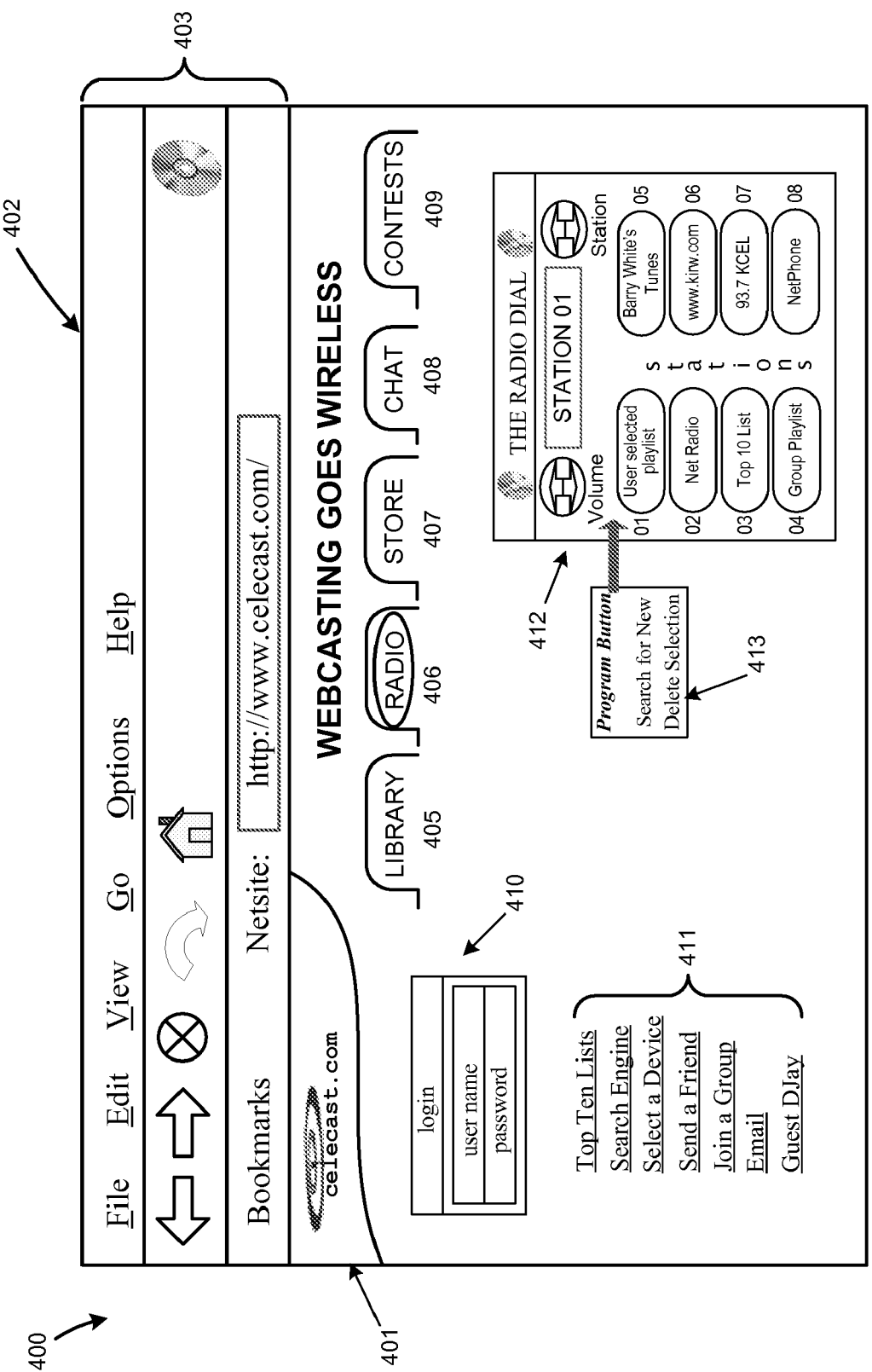
FIG. 4 illustrates a graphical user interface (GUI) for displaying selectable audio information according to one aspect of the present invention.

FIG. 4, described in greater detail below, illustrates one embodiment of providing an Internet website for displaying selectable audio information. For example, the Internet website may include music and/or artist search engines, playlists, top 10 charts, artists by genre, and other information associated with audio information. A user may select information associated with the audio information and digital engine 101 can maintain the information or data associated with the selected information in a digital format. Communications engine 102 coupled to digital engine 101 may wirelessly communicate data associated with the selected audio information to electronic device 103. Therefore, a user may access and select audio information via an Internet website and wirelessly communicate the data to an electronic device. As such, system 100 advantageously allows for wireless communication of selected audio information to electronic devices that may be remotely located from a conventional terrestrial communication network.

Electronic device 105 may be configured in a plurality of ways for receiving wireless communication of selected audio information. In one embodiment, electronic device 105 may be operable as a component configured to receive a cellular signal comprising the selected information communicated by the communication engine. For example, a device having a cellular modem may be operable to receive the information at specified intervals. Upon receiving the information the electronic device may process the received information. Electronic devices are described in more detail below and may include a network radio, a modular device, an audio system, a personal digital assistant (PDA), a cellular phone, or other electronic devices operable to receive information wirelessly communicated by communication engine 102.

Communications engine 102 may be operable to wirelessly communicate selected information to electronic device 103 in a plurality of ways. The present invention advantageously allows for several different embodiments of wirelessly communicating selected audio information to electronic device 103 and is not limited to any specific configuration described below. Several different types or combinations of wireless communication may be realized by the present invention. Communications engine 102 may be operable to wirelessly communicate the selected information from an information network, such as the Internet, to an electronic device operable to receive wireless communications. In one embodiment, communications engine 102 may comprise a conduit to interface information with a wireless communication network. The conduit may configure the information located within the information network into a format operable to be transmitted via wireless communication.

For example, a wireless device may be operable to receive packets of information having a specific size and in a specific format. In such an embodiment, communications engine 102 could format the information into a desirable format for wirelessly communicating the information to electronic device 103. Several types of wireless communication may be used by communications engine 102 to communicate the selected information to an electronic device. Communications networks such as GSM, Digital Satellite communication, SB, Radio bands, DRC, SuperDRC or other systems or types of transmission such as TDMA, CDMA, spread spectrum, etc. or frequencies such as between about 1.7 GHz and 2.0 GHz may be realized by the present invention for communicating information or data representing the selected audio information to electronic device 103.

In one embodiment, the selective information may be communicated using a digital broadcast signal. Digital broadcast includes providing information via a signal such as AM, FM, and the like. Digital information may be included or encoded as a sub-carrier within the broadcast signal and received by electronic device 103. A digital sub-carrier may include a selective bandwidth of frequencies for a specific radio station (i.e., 6 MHz for FM). The selective information may be wirelessly communicated to electronic device 103 utilizing a communication engine 102 operable to communicate the selective information via a digital FM signal. In this manner, selective information may be communicated within digital FM sub-carriers to an electronic device operable to receive the information. For example, a user may subscribe to communicate the information via an FM sub-carrier and receive the selective data through wireless communication via a specified FM sub-carrier.

In one embodiment, the selected information may be formatted and transmitted to achieve a desirable transmission rate. For example, conventional systems may transmit information at a speed of 10 kilobits per second. Therefore, for 1 megabyte of information to be communicated to an electronic device, a transmission time of approximately 800 seconds may be required. The present invention may allow for a relative increase in transmission speed by removing the requirement that information be communicated asynchronously to an electronic device. For example, conventional wireless communication utilizes a specified frequency to communicate information in two directions (i.e., cellular phones). As such, information is communicated across a channel in an asynchronous manner to provide a continuous audio signal to the recipient.

The present invention advantageously allows for signals to be transmitted to an electronic device in a less than asynchronous manner. For example, if a user selected a song to be wirelessly communicated to an electronic device, system 100 could communicate the information in a less than asynchronous manner allowing the selected information to be transmitted efficiently thereby decreasing the overall download time for the selected audio information. In one embodiment, the selected information may be compressed and transmitted across the same frequency but at different phases thereby allowing plural signals having different phases to be wirelessly communicated to an electronic device. Therefore, the electronic device may be operable to receive multiple phased signals and process the selective information accordingly.

In one embodiment, the information may be wirelessly communicated at a relatively slow transmission rate. For example, a user may schedule when the selected audio information may be used by electronic device 103. The user may select several different audio tracks or songs to be transmitted to an electronic device associated with the user's vehicle such that the user can listen to the user selected audio information during the drive home at the end of a workday. Therefore, it may be desirable to utilize a slower transfer speed due to the extended amount of time available prior to actual use of the selected audio information. In this manner, communications networks having less or slower transfer rates may be used to wirelessly communicate the selected audio information to the electronic device.

In another embodiment, high-speed wireless communication networks may be used to communicate the selected audio information. For example, a user may want to listen to an Internet broadcast of an Internet radio station. Therefore, high-speed communication may be required to wirelessly communicate or stream the selected audio information to an electronic device. In another embodiment, a hybrid of wireless communication rates may be deployed depending on the requirements of the selected audio information and/or the electronic device. For example, the selected audio information may first be transmitted to the electronic device via high-speed communication until enough information has been wirelessly communicated and buffered into a memory device operably associated with the electronic device. Upon communication of a certain percentage of the selected audio information, slower communication speeds may then be used to communicate additional selected audio information.

Therefore, system 100 may be configured in a plurality of ways to communicate selected information to electronic device 103. Digital engine 101 may be used to maintain data or information associated with the selected information and communication engine 102, communicatively coupled to digital engine 101, may wirelessly communicate selected information to electronic device 103.

Figure 2:
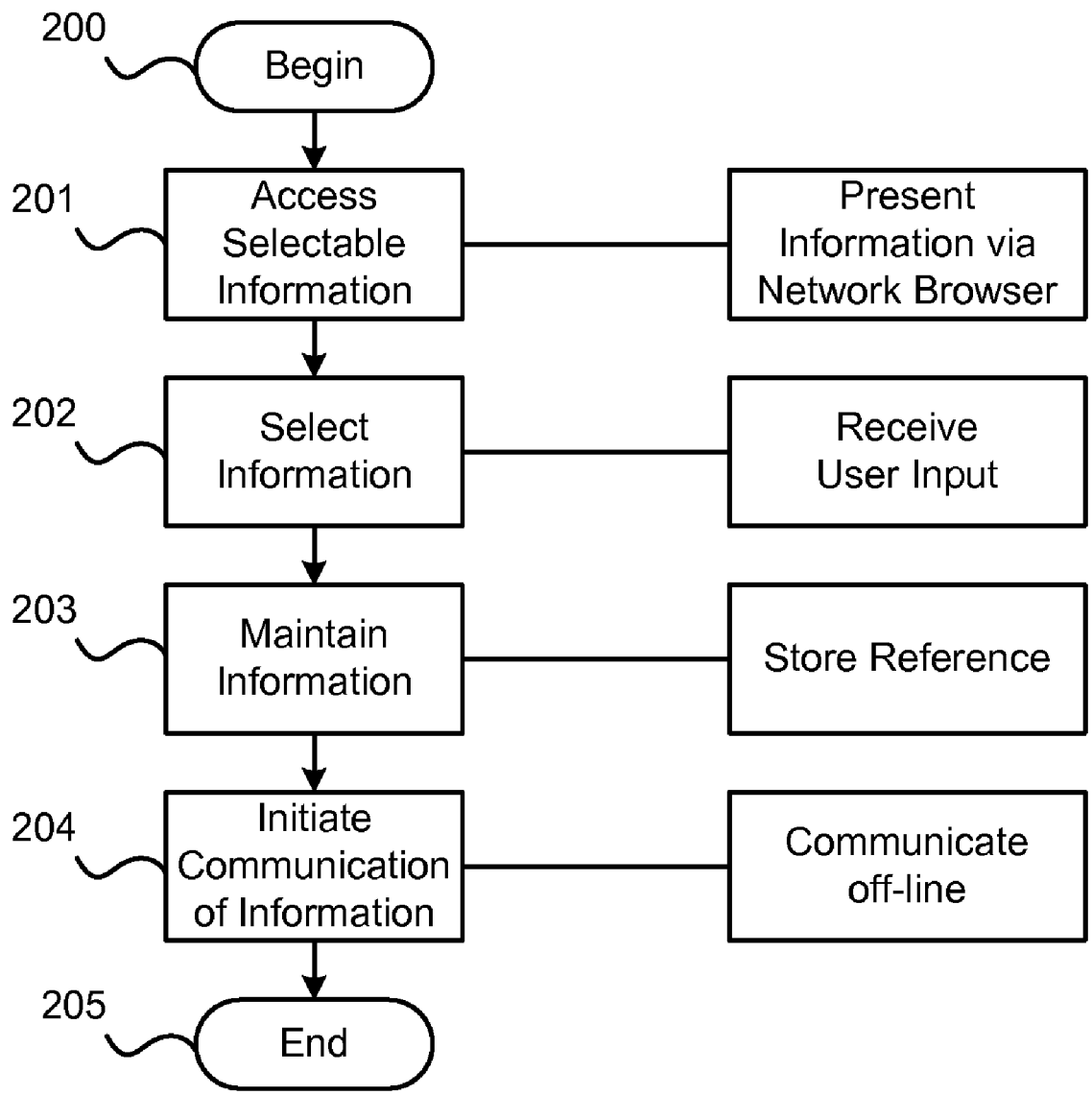
FIG. 2 illustrates a block diagram of a method of wirelessly communicating selected information to an electronic device.

FIG. 2 illustrates a block diagram of a method of wirelessly communicating selected information to an electronic device. The method may be used in association with the system illustrated in FIG. 1 or other systems operable to utilize the method of FIG. 2.

The method begins generally at step 200. At step 201, selectable audio information may be accessed utilizing a network communications device. For example, selectable audio information may be displayed at an Internet website accessible by a personal computer. In another embodiment, the selectable information may be accessed utilizing a wireless communications device such as, a cellular phone, a PDA device, or other devices operable to provide access to the selectable audio information.

Upon accessing the selectable information, the method proceeds to step 202 where a user can identify or select audio information to be wirelessly communicated to an electronic device. For example, a user may select an entire album to be wirelessly communicated to a PDA device.

Upon the user selecting the audio information, the method proceeds to step 203 where the method maintains information associated with the selected information. In one embodiment, the information may be an audio file, such as a wave file, and MP3 file, etc. representative of the selected audio information. In another embodiment, a network location that comprises a file representing the selected information may be maintained. Another example may include a network location of a network broadcast of audio information. Therefore, the method at step 203 may maintain several different types of information associated with the selected audio information.

Upon maintaining information or data associated with the selected information, the method proceeds to step 204 where the method wirelessly communicates information associated with the selected information to an electronic device. For example, if an audio file associated with the selected audio information was maintained, the method would communicate the audio file to the electronic device. In another embodiment, a link or network address broadcasting the selected audio information may be accessed and, at step 204, wirelessly communicated to an electronic device. In another embodiment, a combination of different types of audio information may be wirelessly communicated to an electronic device. Upon transmitting the selected audio information, the method proceeds to step 205 where the method ends.

Selected audio information may be communicated in a plurality of ways as described above including communicating via a cellular communications network to an electronic device operable to receive cellularly-communicated signals. For example, the information may be selected from a website operable to display selectable information. Upon selecting the audio information, a data file representing the selected audio information may be wirelessly communicated to an electronic device thereby allowing a user to select audio information via the Internet and wirelessly communicate the information to an electronic device.

In some embodiments, the wireless communication to an electronic device may occur in an off-line environment. For example, a user may go "on-line" to access a website and select information and then go "off-line" or end the browsing session. The wireless communication may then occur while the user is off-line thereby removing the confines of using an active or on-line browsing environment (i.e. Internet radio broadcast, streaming audio, etc.) for accessing selected information. Therefore, the method of FIG. 2 allows for information, such as audio information, to be communicated from a network location such as a web site, to an electronic device "via" wireless communication. The present invention advantageously allows users to access and download information accessible by a network location to an electronic device operable to receive wireless communications thereby reducing the need for land lines, terrestrial communication networks, etc. for communicating selective information.

In one embodiment, the method of FIG. 2 may be deployed in association with an Internet website operable to display selectable links for downloading information. The information may include audio information such as MP3s, streaming audio, streaming. Internet broadcasts, etc. are selectable by a user and operable to be wirelessly communicated to an electronic device. By providing a user with a website of selectable audio information operable to be wireless communicated to an electronic device, a user may customize information communicated to an electronic device. In one embodiment, a user may communicate information to an electronic device that may not be owned by the user. For example the method of FIG. 2 could be modified to allow a user to wirelessly communicate audio information to a plurality of electronic devices that may or may not be owned by the user.

Figure 3:
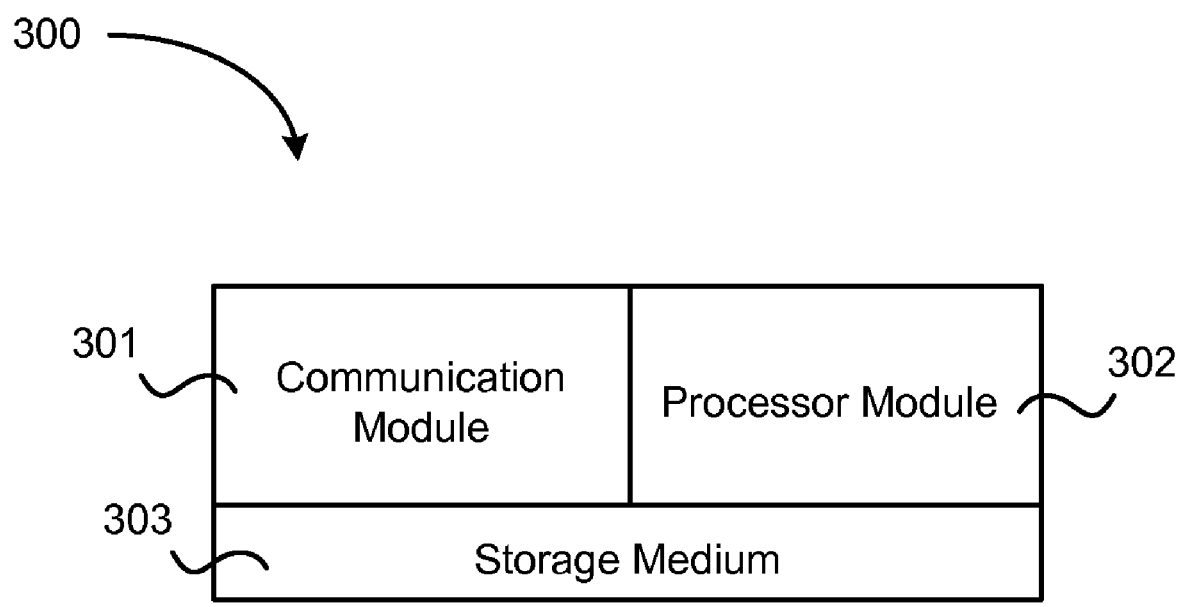
FIG. 3 illustrates an electronic device operable to receive selected audio information in accordance with the teachings of the present invention.

FIG. 3 illustrates an electronic device operable to receive selected audio information in accordance with the teachings of the present invention. Electronic device 300 includes a communication module 301 such as a transceiver coupled to storage medium 303 such as a high speed buffer, programmable memory, or other devices operable to store information. Electronic device 300 may also include processor 302 operably associated with communication module 301 and storage medium 303. Processor 302 may be operable to process wirelessly communicated selected information and in one embodiment may be integrated as part of communication module 301 of storage medium 303. In the same manner, as larger scale integration of electronic devices proliferate, communication module 301, processor 302, and storage medium 303 may be integrated into one communication component or device operable as electronic device 300.

Processor 302 may be operable using software that may be stored within storage medium 303. In one embodiment, software upgrades may be communicated to electronic device 300 via wireless communication allowing for efficient system upgrades for electronic device 300. Storage medium 303 may include one or several different types of storage devices. For example, storage medium 303 may include programmable gate arrays, ROM devices, RAM devices, EEPROMs, minidisks or other memory devices operable to store information.

During use, electronic device 300 receives wireless communications of selective information. The information may be transmitted via a wireless communications network and received by electronic device 300 via transceiver 301. Transceiver 301 may be operable to convert the received wireless communication signal into a desirable format and store the received information within storage medium 303. The received information may then be processed by electronic device 300.

In one embodiment, electronic device 300 may be operable as an audio player configured to play digital representations of music. For example, electronic device 300 may also include an MP3 player operable to process the received information into an audio signal. Therefore, electronic device 300 may be used to receive wirelessly communicated MP3 audio files and play these files using an MP3 player when desired. In another embodiment, electronic device 300 may be configured as a PDA wherein the PDA includes a web browser operable to wirelessly communicate with the Internet. The PDA device may include a user interface allowing a user to select information to be wirelessly communicated to electronic device 300.

By providing a website of selectable information, the PDA devices may provide an efficient embodiment for electronic device 300 in that is allows a user to access and select information using a wireless communication network and receive the selected information using the same or different wireless communication network. In yet another embodiment, electronic device 300 may be configured as a component operable to receive selective information via wireless communication and communicate the information to a second electronic device such as an automobile sound system, home stereo, etc.

For example, electronic device 300 may utilize transceiver 301 to receive wirelessly communicated information. Electronic device 300 may then be coupled to an automobile sound system using an interface and communicate the received information to the automobile sound system. In this manner, electronic device 300 may be used to provide the automobile sound system with audio files received via wireless communication.

In another embodiment, electronic device 300 may be operable to communicate the received audio information to an audio system via a localized communications-signaling network. One such network may include utilizing "Bluetooth" communication standard, used to provide communication between electronic devices in a proximal setting. In one embodiment, electronic device 300 may be integrated into an audio component such as a radio receiver. Electronic device 300 integrated into an audio component may be configured to process digital audio files wirelessly communicated to an audio component. In another embodiment, electronic device 300 may be operable to communicate with an analog receiver at a predetermined frequency.

For example, a specific frequency may be selected (i.e., 93.7 MHz) for communicating the wireless received selected information from electronic device 300 to a localized audio system. Electronic device 300 communication of the wirelessly received information allows a conventional receiver to receive the selected audio information. In one embodiment, the conventional receiver may be configured to receive a digital sub-carrier, on-carrier, or other within a specified frequency. Therefore, electronic device 300 may be operable to locally transmit the signal at a specific frequency thereby allowing the conventional receiver to receive the information. In another embodiment, electronic device 300 may be operable to scan plural bandwidths to receive the selective information. For example, transceiver 301 may be operable to receive selective information across several frequencies and process the received information accordingly.

In another embodiment, electronic device 300 may be operable to scan several frequencies to obtain the desirable information. For example, a user may select several Internet broadcasts comprised of streaming audio information. Therefore, the information may be transmitted across several wireless frequencies receivable by electronic device 300. Electronic device 300 may then be operable to allow a user to scan wirelessly communicated Internet broadcast signals thereby providing a user selected virtual broadcast radio network. In another embodiment, electronic device 300 may include a user interface operable to communicate with an Internet website operable to display selectable audio information. The Internet website may be configured as a user-preferred environment displaying a users selected audio information. Internet broadcast selections, streaming audio selections, etc.

With a display device for displaying a Website having selectable information, electronic device 300 may allow a user to select audio information via a user interface and receive the selected information via wireless communication thereby providing a customizable WebRadio device for the user. In another embodiment, electronic device 300 may be a modular device configured to be coupled to, for example, a portion of a cars interior. For example, electronic device 300 may be mounted to a portion of a car's console thereby providing a removably coupled electronic device operable to wirelessly receive selected audio information. As a removable device, electronic device 300 may also be coupled to a home audio system, a portable radio system or other systems thereby providing a versatile electronic device operable to receive wirelessly communicated selected audio information.

In another embodiment, electronic device 300 may be operable as a PDA and/or a cellular phone that may be mounted to an automobile's console. Electronic device 300 may then integrate with a user's automobile to provide an all-encompassing communications device. For example, electronic device 300 configured as a PDA and cellular phone may allow for communication with a user's email account, voice mail account, the Internet, as well as allowing for the receipt of selected audio information via wireless communication. Electronic device 300 may be operable in a hands-free mode allowing a user to maintain safe driving fundamentals. During use, electronic device 300 may be processing selective audio information for communicating with an automobile audio system and may further be operating to receive incoming cellular calls.

Electronic device 300 may be set-up by the user to pause the music being played and allow the received cellular call to be communicated either via an independent speaker or utilizing the automobiles "audio system." Additionally, electronic device 300 may be operable to adjust the listening level of an automobile's audio system, it may play received voice mail messages, allow a user to view the Internet, etc. In one embodiment, electronic device 300 may be operable as a dual mode electronic device capable of receiving both digital and analog wireless communication signals. In this manner, electronic devices may efficiently utilize available bandwidth for receiving selected information from a communications engine. For example, transceiver 301 may be a wireless communications modem operable to receive digital or analog signals.

FIG. 4 illustrates a graphical user interface (GUI) for displaying selectable audio information according to one aspect of the present invention. The GUI may be operable with a computer system, cellular device, PDA, or other electronic devices or systems operable to display the GUI of FIG. 4. The GUI, shown generally at 400, may be displayed using a conventional web browser 402 such as Microsoft® Internet Explorer, a WAP browser, or other browsers operable to display the audio information. Browser 402 includes browser functions, shown collectively at 403, for navigating a network such as the Internet or an intranet. Homepage 401 may be displayed using browser 402 and may include several functions, features, information, etc. related to audio information. Home page 401 may be developed using several different types of programming (i.e., HTML, XML, Java, etc.) used to developing a network location or website.

The present invention is not limited to any one specific type of software and may be realized in plurality of ways as can be appreciated by those skilled in the art. Homepage 401 may also include login region 410 allowing a user to log into homepage 401 and display a user-preferred environment. For example, a user may want Radio Dial 412 to appear when a user logs into homepage 401. In another embodiment, a user may want to view a current playlist selected by the user or the status of wirelessly communicated playlist. A user may also provide demographic information allowing advertisers to access the demographic information and provide advertisements based upon the demographic information. For example, an advertiser may want to target Hispanic females in the 21-25 year old age group.

Through providing demographic information to advertisers, when a user logs into homepage 401 selective advertising can be "targeted" for a group of users. Homepage 401 may also include several tabs for efficiently navigating homepage 401. Library tab 405 may be provided to allow a user to browse available audio information that may be presented by title, genre, artist, decade, culture, etc. Store tab 407 may also be provided for locating items available for purchase such as CDs, PDA devices, MP3 players, wireless communication hardware, interfaces, software or other types of products that may be purchased while on-line. Chat tab 408 may also be provided allowing a user to chat with other users of home page 401. For example, a guest musical artist may be available to chat with visitors of home page 401 via a chat page associated with chat tab 408. Home page 401 may also include contest tab 409 for displaying current contests, prizes, and/or winners.

Radio tab 406 may also be provided for displaying audio information. For example, radio tab 406 may display a collective menu 411 of selectable functions or features associated with audio information. Top ten lists may be provided to a user based on several different billboard polls or genres. A search engine may be provided allowing a user to search for a specific type of audio information such as an artist, song title, and genre. Internet radio station, etc. In one embodiment, a user may input the lyrics to a song within the search engine. As such, the search engine may locate several different songs having the desirable lyrics and allow a user to select the search results. A user may also use a select a device feature that allows a user to select a destination device for communicating selected audio information. For example, a user may want to communicate a playlist to several different devices such as a PDA, a home computer system, a work computer system, etc.

As such, a user can communicate selective information to several devices without having to download the information separately for each device. A send a friend link may also be provided allowing a user to send selective audio information to a friend's electronic device. A user may also join a group comprised of individuals that select a certain genre of music to be communicated to the user's electronic device. For example, a user may want to join a group that plays only 50s swing music. As such, the user could communicate the group's selected songs to the user's electronic device. A user may also utilize an email account provided by homepage 401 allowing a user to correspond with others via email. A user may also access a list of guest DJs that may provide playlists of songs chosen by the guest DJ and selectable by a user.

In one embodiment, a user's radio dial 412 may be provided when a registered user logs into homepage 401. As such, radio dial 412 may include several functional buttons similar to conventional systems such as a volume control and a station control. However, radio dial 412 surpasses the limitations of conventional systems through providing a programmable radio dial of user customized audio information. Radio dial 412 includes several stations that may be programmed using program interface 413. The preset stations may include several different types of user customized preset information such as user selected playlists, Internet broadcast stations, top lists, group playlists, artist-selected lists, on-line radio station, conventional radio stations. Internet phone, cellular phone, etc. and other functions, features, or information associated with audio information.

Radio dial 412 may also be displayed as a separate user interface and in some embodiments, does not require a "browsing" environment to view radio dial 412. For example, an electronic device, such as a PDA, having a display may graphically present radio dial 412 to a user. One example may be using electronic device in association with an automobile audio system. Electronic device may display radio dial 412 and may allow a user to navigate, modify, select, adjust volume, access daytimer, access phone lists, etc. or perform other functions while the electronic device is used in association with an automobile sound system. Therefore, radio dial 412 may be operable as an application for use with several different types of electronic devices (i.e., computer systems, portable computing devices, cellular phones, etc.) operable to display radio dial 412 and in come embodiments may be wirelessly communicated to an electronic device.

In another embodiment, homepage 401 may allow a user to select when to download the information to an electronic device. For example, a user may want to listen to a certain genre of music at a specific time of day thereby allowing a user to select the information. As such, a user may select a different playlist for every day of the week thereby allowing a user to listen to different songs on different days of the week. The user can further identify when the selected playlist should be available for listening. For example, if a user wanted to listen to "playlist #1" on Monday morning during the drive into work between 8:00 am and 9:00 am, the user would enter the time and the day "playlist #1" would be available for listening. In this manner, the playlist may be communicated to the electronic device thereby allowing a user to listen to selective audio information at a desirable time.

Figure 5A:
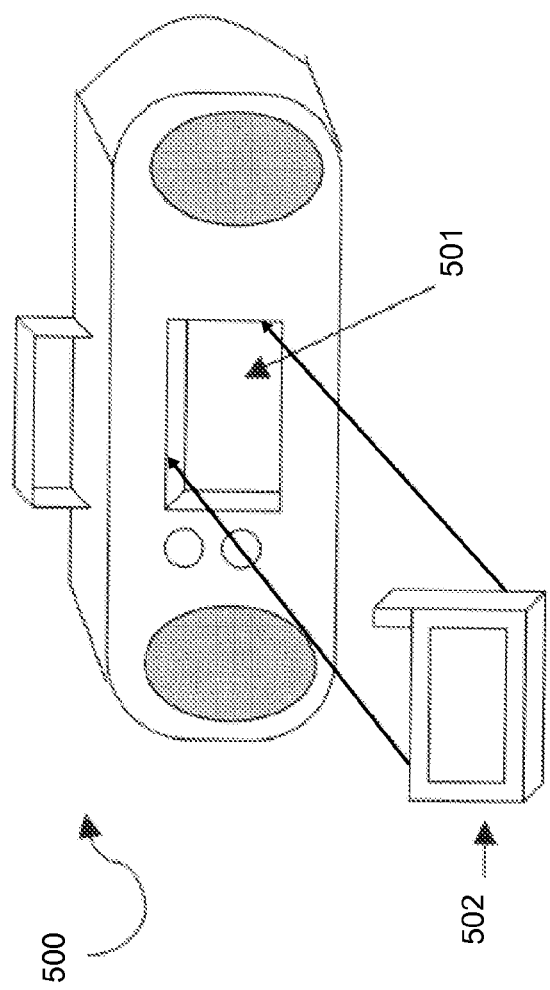
FIG. 5A illustrates a portable radio system having a mount for an electronic device according to one embodiment of the present invention.

FIG. 5A illustrates a portable radio system having a mount for an electronic device according to one embodiment of the present invention. Portable radio 500 includes a mount 501 operable to receive electronic device 502. Mount 501 may include a connector operable to provide communications and power to electronic device 502. During use, electronic device 502 when mounted within portable radio 500 communicates with portable radio to provide remotely received selective audio information. In one embodiment, electronic device 502 may include a user interface allowing a user to access the Internet. Therefore, selective audio information located on the Internet may be accessed by the user and remotely communicated to electronic device 502 coupled to portable radio 500.

In another embodiment, portable radio 500 may include memory operably located within for storing downloaded information. For example, portable radio 500 may include 32 MB of RAM allowing electronic device 502 to receive selective information and download the selective information to memory located within portable radio 500. In this manner, the downloaded music may be operable to be played within portable radio 500 while allowing electronic device to be removed from portable radio 500. Therefore, portable radio 500 including electronic device 502 allows a user to communicate selected audio information to portable radio 500.

Figure 5B:
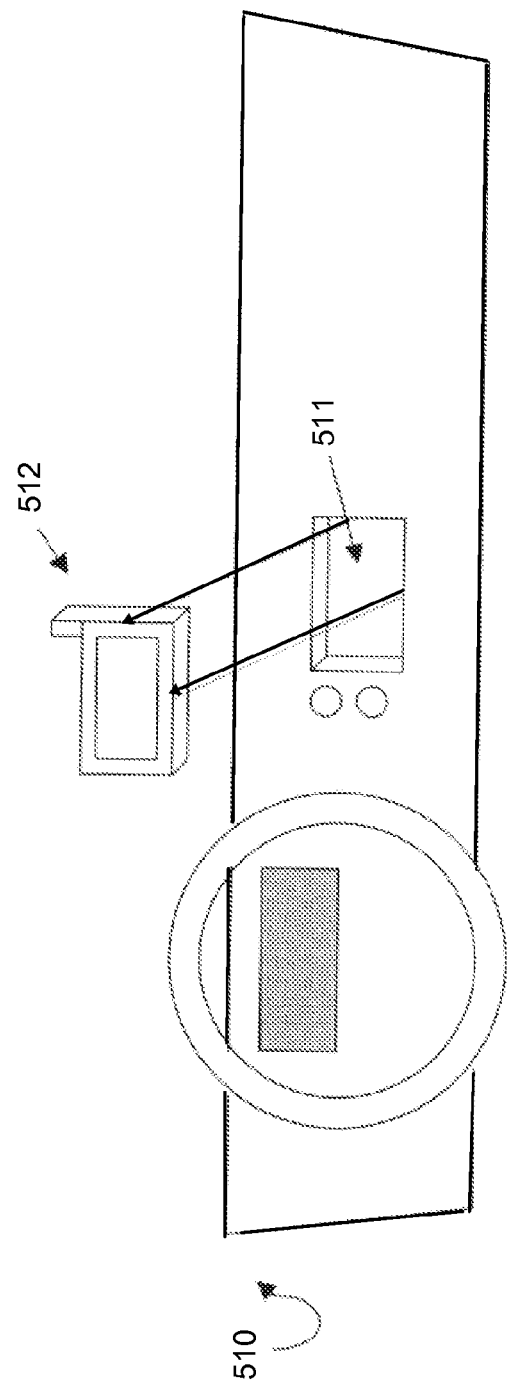
FIG. 5B illustrates an automobile console having a mount for coupling an electronic device according to one aspect of the present invention.

FIG. 5B illustrates automobile console having a mount for coupling an electronic device according to one aspect of the present invention. Console 510 includes mount 511 operable to receive electronic device 512. Mount 511 may be located in many different locations within an automobile such as coupled to a sun visor, center console, dashboard, floorboard, etc. Mount 511 allows the user to couple electronic device 512 to the automobile and provide an interface for communication between electronic device 512 and the automobile audio system. Mount 511 may also include a power connection that allows electronic device 512 to use the automobiles power during use. The power connection may also be used in association with a recharging circuit operable to recharge a power supply within the electronic device. During operation, electronic device 512 coupled to mount 511 may receive selected audio information via wireless communication and communicate the selective information to the automobile audio system.

In one embodiment, the automobile may include memory operable associated with the automobile for storing-information. The memory may be used in association with mount 511 and electronic device 512 to store the selected audio information. In this manner, voluminous audio information can be stored within the memory allowing electronic device 512 to receive additional information. In one embodiment, a mount may be provided for a home audio system (not shown) for downloading selected audio information for use with a home audio system. For example, a mount device may be coupled to a home stereo system such that the upon placing an electronic device such as electronic device 500 within the mount, selected audio information may be communicated to the home audio system thereby allowing a home audio system to be used in association with an electronic device.

Figure 6:
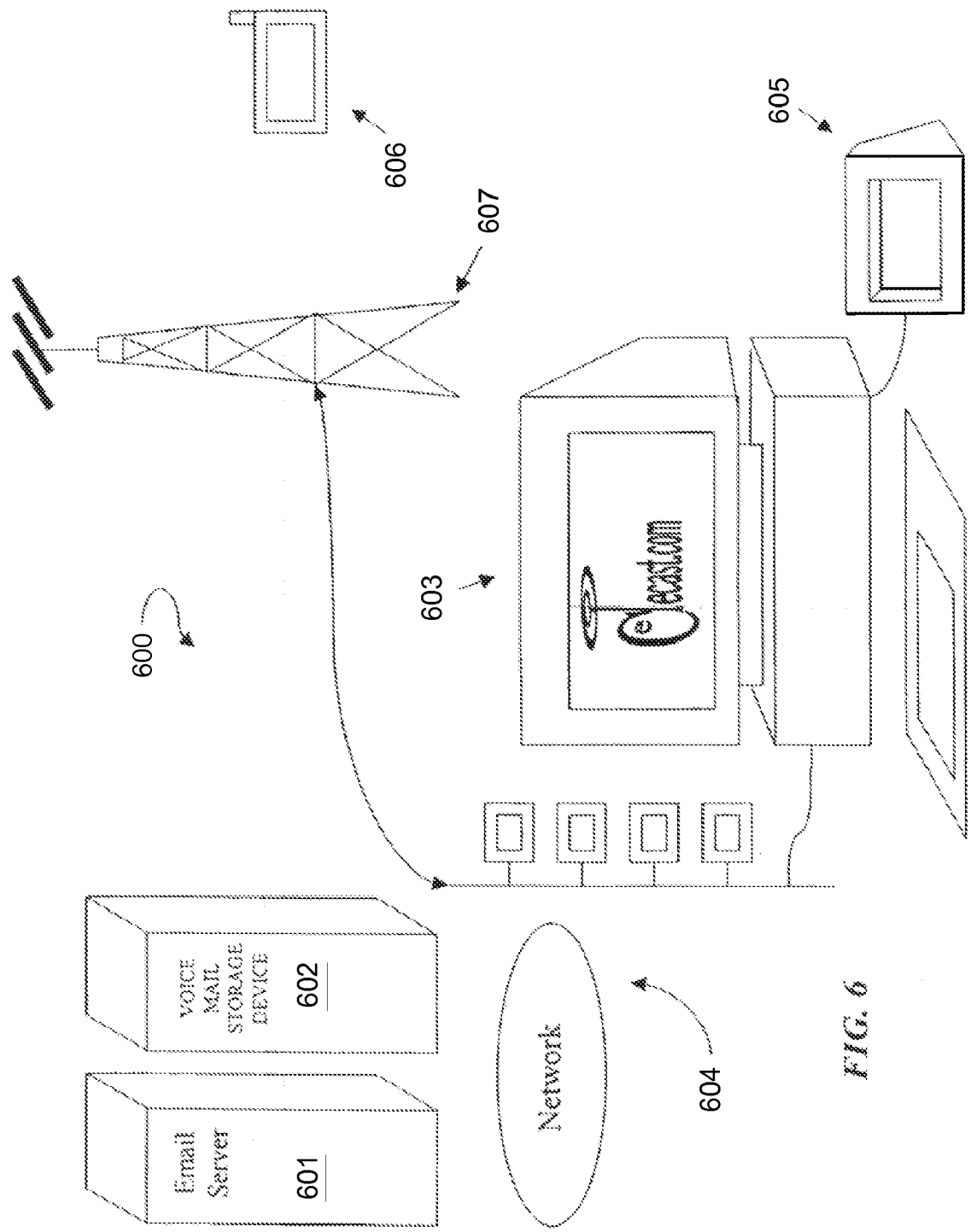
FIG. 6 illustrates a block diagram of a system for communicating voice mail messages using email according to one embodiment of the present invention.

FIG. 6 illustrates a block diagram of a system for communicating voice mail messages using email according to one embodiment of the present invention. The system, indicated generally at 600, includes email server 601 coupled to a voice mail storage device 602. System 600 further includes a computer system or network terminal 603 such as a computer coupled to network 604. System 600 further includes mount 605 for mounting electronic device 606 for hardwire communication of information. Device 606 may also communicate with network 604 using a wirelessly communication network operably associated with network 604 and coupled, for example, via tower 607.

During operation, system 600 communicates voice mail messages to a user utilizing email server 601. For example, if a user receives a voice mail message, email server 601 would be notified and a voice mail message would be sent to the user's email account in the form of an email message. For example, a voice mail message would be sent to a user's email account within intranet 604 in the form of an audio file as an attachment to the email. Upon receiving the email, a user may click on the audio file representing the voice mail message to hear the message left by a caller.

In one embodiment, a user may be accessing the Internet via a phone line and, as such, be unable to receive notification that a voice mail message has been received. System 600 would receive the voice mail message and send an email comprising the voice mail message to the user email account.

In this manner, a user can remain connected to the network and receive voice mail without having to log off or disconnect from the Internet. In one embodiment, a user may receive the voice mail message via a portable electronic device. For example, a user may be using remote device 605 operable to receive wirelessly communicated information. System 600 would receive the voice mail message and forward the voice mail message to a user's portable electronic device 606. In this manner, a user may be capable of receiving voice emails at remote locations.

In another embodiment, a user may subscribe to use an Internet email account that may be operably associated with system 600. Utilizing an Internet email account may allow a user the flexibility to check voice email messages from any location in the world. For example, a user may access a "Hotmail" email account while traveling on business in a foreign country. The user, upon gaining access to the "Hotmail" account, would be able to listen to voice mail messages sent to the user via the "Hotmail" email account. Through utilizing an email account to receive voice mail messages, a user may be afforded great flexibility in communicating voice mail messages. For example, a user may be able to forward a voice mail message received in the form of an email to one or a plurality of other email accounts. In this manner, a voice email message may be sent efficiently to other email users.

For example, a user may maintain a distribution list of individuals working on a particular project that may have a need to hear certain voice email messages. In this manner, a user may efficiently disseminate information to other individuals while adding additional textual information to the body of the email allowing a user to comment on the original voice email message. In another embodiment, a user may forward a received voice email message to another account operable to receive forwarded voice email messages. For example, system 600 may be operable to receive an email message having a voice mail message as an attachment. The system would then be operable to forward the voice mail message to specified phone number, separate email account, and/or voice mail account, etc. thereby providing a user flexibility in receiving voice email.

In one embodiment, a user may utilize an email account to establish an answering service for voice mails. For example, a user's telephone number may be operable with an email account to provide an answering service. A user may record a message for a specified phone number or extension and, upon receiving an incoming call; the recorded message may be played back to incoming the call's initiator. System 600 would then forward the received voicemail message via an email account to the user. For example, a user may have an account set up at a residence for receiving voicemail messages via a user-defined email account. The user could then forward all received voice mails from the home account to an email account at a place of work. Therefore, the user may have complete access to received voicemail messages. In the same manner, a user could set up their work phone number to forward a voicemail message to the user's home email account thereby allowing a user to receive a voicemail at a home email account. Therefore, system 600 may be operable in a plurality of ways to provide email messages comprised of voicemail messages received via a voice mail or email account.

Figure 7:
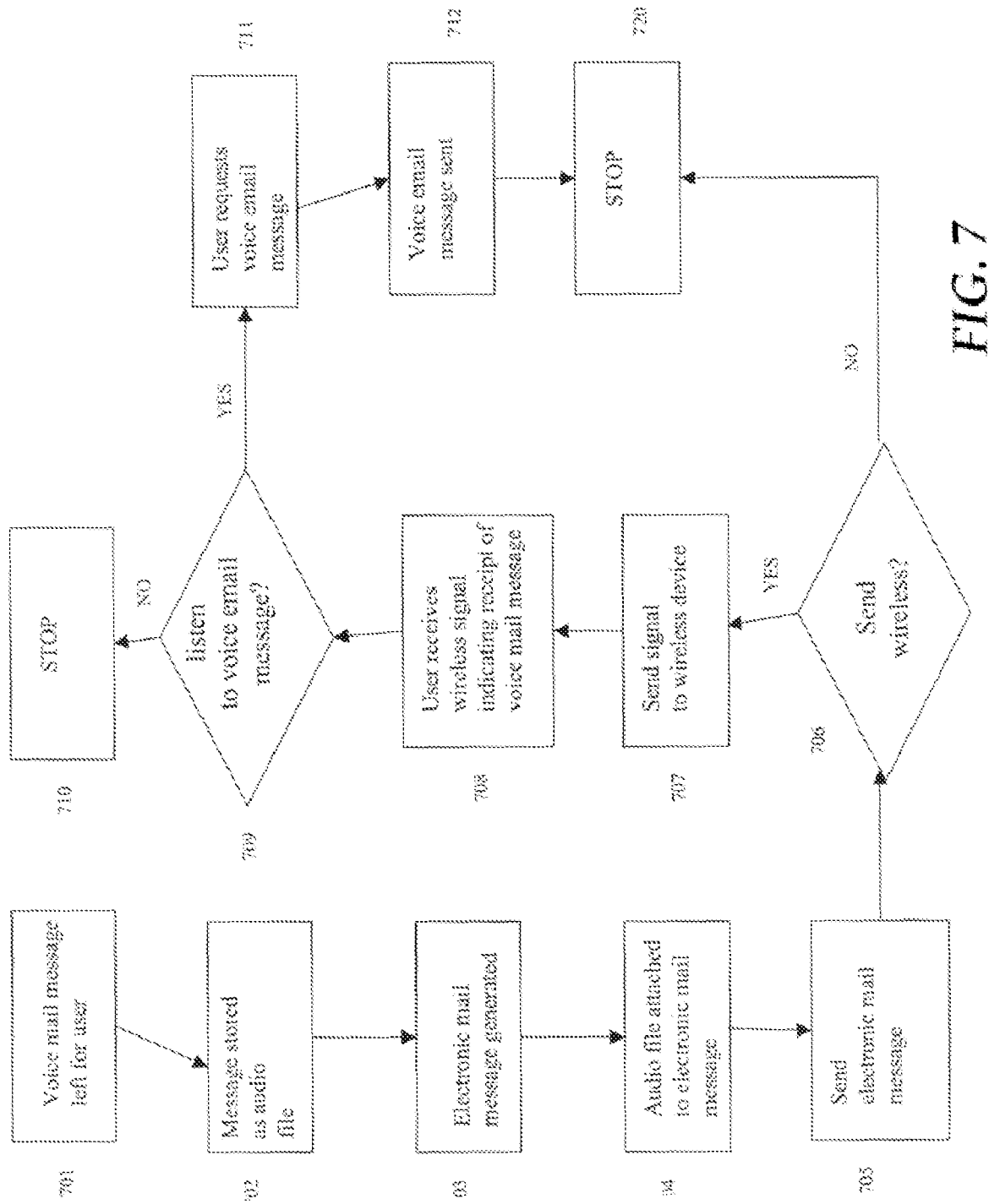
FIG. 7 illustrates a flow chart for providing voice email messages according to one embodiment of the present invention.

FIG. 7 illustrates a flow chart for providing voice email messages according to one embodiment of the present invention. The method begins at step 701 where a voice mail message is left for a user. The message could be at a residence, place of business, etc. The method then proceeds to step 702 where the message may be stored as an audio file within a database operable to store a file comprised of the voice mail message. Upon storing the file, the method proceeds to step 703 where an electronic mail message may be generated. The electronic mail message may be addressed to the recipient of the voice mail message. The method then proceeds to step 704 where the audio file representing the voice mail message is attached to the electronic message.

Upon attaching the audio file, the method then proceeds to step 705 where the email message may be sent to the email address. Upon sending the email message the method proceeds to step 706 where the method determines if the email message should be sent to a wireless electronic device. If the message is not to be sent to a wireless device, the method proceeds to step 720 where the method ends. If the message is to be sent to a wireless electronic device, the method proceeds to step 707 where a signal may be sent to the wireless electronic device and at step 708 an indication is provided to the electronic device indicating that a voicemail message has been received via a user's email account. The method may then proceed to step 709 where the user decides whether or not to listen to the voice email message. If the user decides not to listen to the voice email message, the method may proceed to step 710 where the method ends. If the user decides to listen to the voice email message, the method proceeds to step 711 where a request may be sent by the electronic device requesting the voice email message be forwarded to the user's electronic device.

At step 712, the voicemail message may be sent to the user's electronic device. Upon forwarding the voicemail message to the user the method may proceed to step 720 where the method ends. As such, FIG. 7 depicts one method of providing an email message comprised of a voice mail message. Certainly, other methods may be deployed as advancements in technology and are made without departing for the spirit and scope of the present invention.

Figure 8:
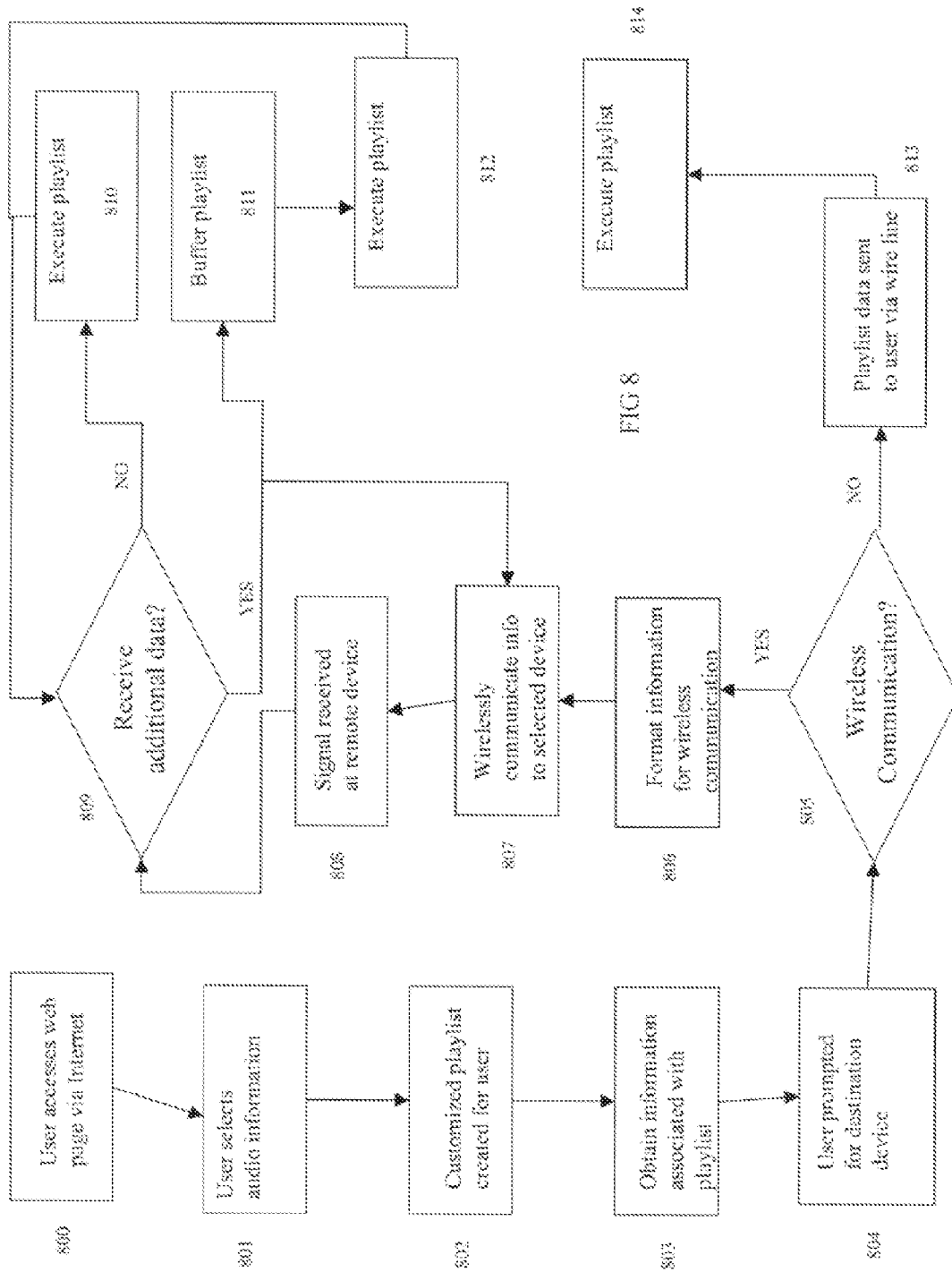
FIG. 8 illustrates a flow diagram of a method for providing selected audio information to an electronic device according to one embodiment of the present invention.

FIG. 8 illustrates a flow diagram of a method for providing selected audio information to an electronic device according to one embodiment of the present invention. The method begins at step 800 where a user accesses a webpage via the Internet. The webpage may be a home page illustrated in FIG. 4 or other web pages operable to display selectable references to audio information. The method proceeds to step 801 where a user selects desirable audio information. For example, a user may select a single song, a plurality different songs, an entire album, a broadcast station, streaming audio, etc. or other selectable audio information. Upon the user selecting a reference to audio information, the method may proceed to step 802 where a playlist may be created that represents the user's selected audio information.

The playlist may be variable in size and comprised of a plurality of different types of available audio information. Upon creating a playlist, the method may proceed to step 803 where information associated with the playlist is obtained. For example, a list of network or URL locations comprised of the desirable audio information may be obtained. In this manner, desirable audio information may be obtained from many different sources such as URLs, network addresses, hard drives, databases comprised of audio information, etc. The sources may be accessed to obtain the selected audio information.

Upon obtaining data associated with the customized playlist, the method may proceed to step 804 where the user is prompted for a destination for the playlist. For example, a user may want to communicate the selected audio information to a remote electronic device, an automobile audio system, a home stereo system, a home computer, an electronic device coupled to a home network or computer system, etc. or other locations or devices operable to receive the selected audio information. In one embodiment, a user may select a device owned by a friend to accept the selected audio information. For example, a husband may want to send a romantic playlist to his wife on their anniversary. In this situation, the husband would select his wife's electronic device as the receiving device for the selected audio information.

Upon selecting a device, the method proceeds to step 805 where the method determines the destination of the selected audio information. If the information is to be sent to a device via a wire line connection, the method proceeds to step 813 where playlist data is sent to a user via a wire line connection. The method may then proceed to step 814 where the playlist is executed at the device. If the information is to be sent to a device requiring wireless communication, the method proceeds to step 806 where the information is formatted for communicating the information to a wireless electronic device. For example, a wireless PDA device may be selected as a destination device for the selected audio information. The PDA device may include an audio player, such as an MP3 player operable to play or execute MP3 audio files. In such an embodiment, the method could format the information such that the information may be wirelessly communicated and subsequently played by the MP3 player.

Upon formatting the information, the method may then proceed to step 807 where the audio information is wirelessly communicated to the selected device. In some embodiments, the device may be operable to receive a limited amount of information based upon storage capacity of the device (i.e., 16 MB). In such a case, the method may divide the information into component parts and periodically communicate the component parts, such as packets, to the electronic device. Upon communicating the audio information, the method may then proceed to step 808 where the signal may be received by the destination or electronic device.

The method may then proceed to step 809 where the method determines if all of the audio information has been received. For example, if 16 MB or 32 MB of selected audio information was initially transmitted due to capacity limitations of the selected device, the method may query the selected device to determine if capacity is available. If available memory exists, the method may proceed to step 807 where the method may communicate additional audio information based upon the amount of available memory. The method repeats until all of the selected audio information has been transmitted.

Upon communicating the selected information, the method may proceed to step 810 where the playlist may be executed. For example, a user may select a continuous communication of selected audio information (e.g., several hours of music. Internet broadcast, etc.). As such, the method may continuously play or execute the received audio information. In another embodiment, the method may proceed to step 811 where the method may store or buffer the received information until it is desirable to execute the received selected audio information. As such, upon executing the selected audio information, the method may proceed to step 809 where the method may repeat. In one embodiment, a user may elect to download a broadcast of an on-line radio station. For example, a user may want to listen to a radio station located in a remote location wherein conventional radio receivers could not receive the desired broadcast. For example, a person living in Houston, Tex. may not be able to receive a radio broadcast signal from a radio station in Seattle, Wash. utilizing a conventional radio receiver.

In accordance with the teachings of the present invention, a user may select an on-line broadcast or radio station as all or a part of the selected audio information. The user may then receive radio broadcasts without having to use a home computer system or conventional radio receiver.

At step 804, a user may select a device that does not require remote communication of information. For example, a user may elect to communicate the selected audio information to device, such as a personal computer, PDA device, MP3 player, etc. coupled via a network connection to the Internet or an Intranet. The user may receive the selected playlist at the determined device for eventual playing. In one embodiment, a user may select a plurality of devices as destination devices for receiving downloads of the selected audio information. For example, the user may want to download the information to a home stereo system, a PDA device, and an automobile stereo. As such, the selected information may be communicated to more than one destination device. In addition, the format of the download may match or conform to the selected destination device(s).

The present invention may be configured in a plurality of ways to communicate desirable audio information to users by allowing users to select desirable audio information and transmitting the desirable audio information to a specified destination thereby allowing a user to receive on-demand customized audio information. Moreover, the download may occur in an off-line environment, allowing a user to enjoy the selected audio information accessed on-line without having to be on-line or utilizing a browsing environment. In one embodiment of the present invention, the method of FIG. 8 may be modified to allow a user to select a "user group" for receiving customized audio information. For example, a "user group" may include users that prefer contemporary jazz wherein a user may request a certain song. Therefore, a virtual request line may be designed for a specific genre of music allowing "members" to transmit audio information to the "group".

In another embodiment of the present invention, the method may be modified to allow a user to select a specific genre to be transmitted to the users device. For example, a user may elect to have random country and western music transmitted to a destination device. The user could efficiently create a radio station format and have the format received at a destination device.

In a further embodiment, a user may select a group of genres to be downloaded to a desirable device. As such, the method may be modified to allow a user to select several different genres to download random music within the specified genres. In another embodiment, a user may elect to download the same music as another individual. For example, a user may want to download the same music as their best friend. Therefore the user could elect to download the same music as their friend or group of friends. In another example, a user may want to listen to the same music that an artist listens to on a specific weekday of evening. For example, a user may want to listen to the same music that Barry White listens to on a Saturday night.

Therefore, the user may select "Barry White's" Saturday night playlist and receive the same playlist Barry White receives on Saturday night. In another embodiment, the method of FIG. 8 may be modified to allow a user to manipulate song post download. For example, a user may want to store, delete, replay, copy, forward, etc. received audio information. Therefore, the method of FIG. 4 may be modified such that a user can manipulate or process the received audio information in a plurality of ways. In one embodiment of the present invention, an on-line radio station may be provided. For example, the radio station may be created for transmitting audio or on-line broadcasts. The on-line broadcasters or hosts may create their own format for broadcast. For example, an on-line radio station may be provided that transmits only children's songs.

Prior to conception of the present invention, conventional radio stations were monetarily limited to be capable of transmitting music such as children's songs to conventional radio receivers. The present invention, by providing a medium for transmitting selectable audio information, enables the existence of on-line broadcasting with little or no overhead cost for a host. A user may select an on-line broadcast for on-line or off-line delivery. In another embodiment, on-line broadcast of audio information representing books or novels may be provided to individuals such as the visually impaired. For example, an on-line broadcast station may provide several hours of audio information broadcast representing books or novels to be broadcast with very little overhead.

Figure 9:
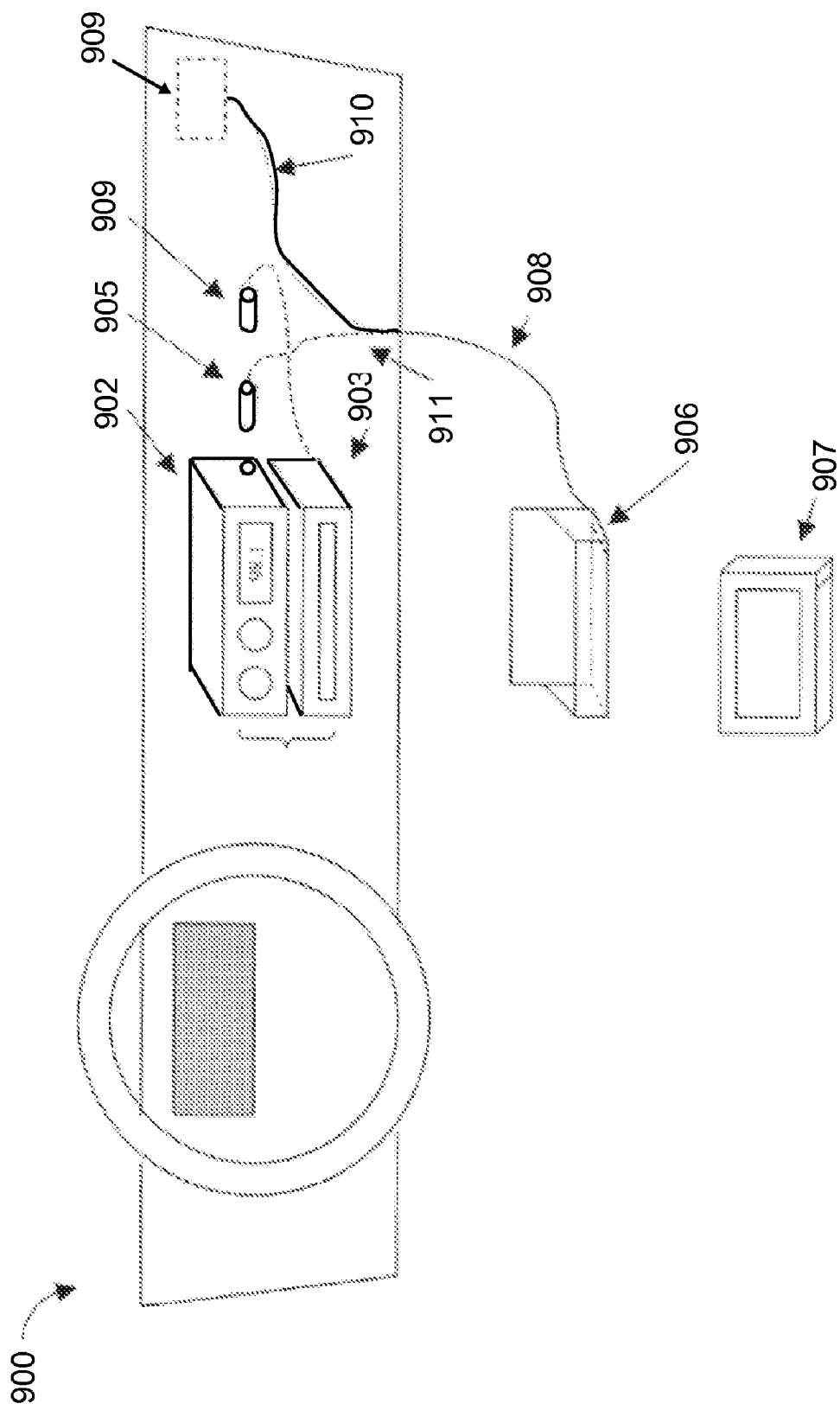
FIG. 9 illustrates an automobile console having a mount for an electronic device according to one embodiment of the present invention.

FIG. 9 illustrates an automobile console having a mount for an electronic device according to one embodiment of the present invention. Console 900 includes a conventional audio system 901 comprised of a receiver 902 and CD player 903. Interface 904 may be coupled to audio system 901 via plug 905 and cable 908, which may be coupled to an auxiliary line into audio system 901. Interface 904 may also include contact 906 for contacting electronic device 907. Cable 908 may be a multiple conductive cable for providing power from the automobiles power system via a protection circuit or fuse 909 for powering electronic device 907. In one embodiment, interface 904 may be operable to recharge electronic device 907 utilizing a power source associated with an automobile.

During operation, electronic device 907 may be mounted within interface 904. Electronic device 907 may also be powered or recharged via power line 910 and communicate with the systems audio system via interface cable or bus line 911. Audio information communicated to electronic device 907 may be transferred to audio system 901 such that a user may listen to selected audio information. For example, a user may have previously selected a plurality of audio files to be transmitted to electronic device 907. Electronic device 907 may communicate the selected audio information to the automobiles audio system that utilizes interface 901 thereby allowing the user to listen to selected audio information. In one embodiment, cable 908 may be custom-installed to audio system 901. For example, the cable may be coupled to an auxiliary line for the system's radio or may be coupled to CD player line 912.

In another embodiment, a radio manufacturer may provide interface 904 as a standard interface integrated into the audio system, thereby allowing communication between electronic device 907, audio system 901 and/or console 900. Electronic device 907 may include a plurality of different types of devices. For example, electronic device 907 may include a PDA device operable to store selected audio information. The information may be either remotely downloaded using an Internet web browser and wireless communication to the PDA device. In another embodiment, selected audio information may communicated to a PDA device via a hard wire coupled to a computer system interfacing with the Internet. In another embodiment, electronic device 907 may include an audio file player operable to play audio files such as MP3s, etc.

The audio files may be remotely or locally communicated to electronic device 907 and upon coupling to audio system 901, the audio files may be transmitted to audio system 901 in a form receivable by audio system 901. Although the disclosed embodiments have been described in detail, it should be understood that various changes, substitutions and alterations can be made to the embodiments without departing from their spirit and scope.

The benefits, advantages, solutions to problems, and any element(s) that may cause any benefit, advantage, or solution to occur or become more pronounced are not to be construed as a critical, required, or essential feature or element of the present invention. Accordingly, the present invention is not intended to be limited to the specific form set forth herein, but on the contrary, it is intended to cover such alternatives, modifications, and equivalents, as can be reasonably included within the spirit and scope of the invention as provided by the claims below.

What is claimed is:

1. An audio system comprising:
a portable device having a single physical interface configured to releasably engage a contacting portion of an interconnection system to form at least a portion of a communication path between the portable device and a separate electronic device, wherein the physical interface has a generally rectangular shape and is configured to couple a first conductive element of the interconnection system with a component of the portable device that outputs data and couple a second conductive element of the interconnection system with a recharging circuit of the portable device, wherein the portable device is configured to accept an over the air download of an application that allows the portable device to request an audio stream representing a local broadcast signal for a channel located remote from a then current location of the portable device;
the portable device having a wireless communication module operable to receive an incoming telephone call and the audio stream; and
the portable device having an audio output engine configured to output information representing a played audio file to the separate electronic device via the physical interface and to alter an outputting of the played audio file in connection with a receipt of the incoming telephone call and configured to output the audio stream.

2. The system of claim 1, further comprising an engine configured to communicate data from the portable device to the separate electronic device to allow the separate electronic device to present an icon on a display of the separate electronic device such that the icon: (a) is a soft button that is linked to a particular audio file saved at the portable device; (b) is selectable by a user via the separate electronic device; and (c) is configured to respond to a user selection by causing the separate electronic device to request the portable device to begin playing the particular audio file.

3. The system of claim 1, further comprising the interconnection system, wherein the interconnection system is operable to couple the portable device to a power supply of an automobile.

4. The system of claim 1, wherein the interconnection system further comprises an FM modulator.

5. The system of claim 1, further comprising the separate electronic device, wherein the separate electronic device wireless receiver.

6. The system of claim 5, further comprising a housing component of the portable device that at least partially defines an enclosure, wherein the wireless communication module and the audio output engine are secured within the enclosure.

7. The system of claim 1, wherein the portable device is configured to accept a different over the air download of a media, further wherein the media is selected from a group consisting of an audio file, a video file, a piece of software, a book, and a message.

8. The system of claim 1, further comprising a housing component of the portable device including a front surface comprising a display, wherein the display represents more than half of a total width of the front surface and more than half of a total length of the front surface.

9. The system of claim 1, the portable device comprising a front surface having a length and a width, wherein the length is longer than the width, and further wherein the physical interface is located on a lengthwise side of the portable device.

10. The system of claim 1, further comprising:
a network based engine that maintains data comprising information associated with files that are executable by the portable device; and
a communications engine that is operably associated with the network based engine and configured to facilitate a communication of data to the portable device.

11. A wireless device comprising:
a single physical interface configured to releasably engage a contacting portion of an interconnection system to form at least a portion of a communication path between the wireless device and a separate electronic device, wherein the physical interface has a generally rectangular shape and is configured to couple a first conductive element of the interconnection system with a component of the wireless device that communicates data and couple a second conductive element of the interconnection system with a recharging circuit of the wireless device, wherein the wireless device includes an application stored thereon that allows the wireless device to request an audio stream representing a local broadcast signal for a channel located remote from a then current location of the wireless device;
a wireless communication module operable to receive an incoming telephone call and the audio stream; and
an audio output engine configured to output information representing a played audio file to the separate electronic device via the physical interface and to alter an outputting of the played audio file in connection with a receipt of the incoming telephone call, and configured to output the audio stream.

12. The wireless device of claim 11, further comprising an engine configured to communicate data from the wireless device to the separate electronic device to allow the separate electronic device to present an icon on a display of the separate electronic device such that the icon: (a) is a soft button that is linked to a particular audio file saved at the wireless device; (b) is selectable by a user via the separate electronic device; and (c) is configured to respond to a user selection by causing the separate electronic device to request the wireless device to begin playing the particular audio file.

13. The wireless device of claim 12, wherein the interconnection system further comprises an FM modulator.

14. The wireless device of claim 11, further comprising the interconnection system, wherein the interconnection system is operable to couple the wireless device to a power supply of another device.

15. The wireless device of claim 11, wherein the wireless device is configured in a housing having a front surface having a length and a width, wherein the length is longer than the width, and further wherein the physical interface is located on a lengthwise side of the housing.

16. The wireless device of claim 11, further comprising:
a housing component of the wireless device that at least partially defines an enclosure, wherein the wireless communication module and the audio output engine are secured within the enclosure;
a front surface of the wireless device that comprises a display, wherein the display represents more than half of a total width of the front surface and more than half of a total length of the front surface; and
an interface programming engine located within the enclosure and configured to allow a user to alter a displayed selectable icon.

17. The wireless device of claim 11, wherein the wireless device is configured to accept an over the air download of the application and a different over the air download of a media, further wherein the media is selected from a group consisting of an audio file, a video file, a piece of software, a book, and a message.

18. The wireless device of claim 11, wherein the wireless device comprises a generally rectangular housing having a display that substantially predominates a face of the housing.

19. A method comprising:
receiving a streaming media signal in a portable wireless device corresponding to a regional broadcasting channel, responsive to a request for the regional broadcasting channel from the portable wireless device via a user selection of the regional broadcasting channel, wherein the portable wireless device is outside of a broadcast region of the regional broadcasting channel;
communicating information representing the streaming media signal from the portable wireless device to a separate electronic device coupled to the portable wireless device via a single physical interface of the portable wireless device configured to releasably engage a contacting portion of an interconnection system to form at least a portion of a communication path between the portable wireless device and the separate electronic device, the physical interface having a generally rectangular shape and to couple a first conductive element of the interconnection system with a component of the portable wireless device that communicates data and to couple a second conductive element of the interconnection system with a recharging circuit of the portable wireless device;
receiving an incoming telephone call in the portable wireless device; and
altering the communication representing the streaming media signal in connection with receipt of the incoming telephone call.

20. The method of claim 19, further comprising communicating data from the portable wireless device to the separate electronic device to allow the separate electronic device to present an icon on a display thereof such that the icon: (a) is a soft button that is linked to a particular audio file saved at the portable wireless device; (b) is selectable by a user via the separate electronic device; and (c) is configured to respond to a user selection by causing the separate electronic device to request the portable wireless device to begin playing the particular audio file.

21. The method of claim 19, further comprising receiving an over the air download of an application that allows the portable wireless device to request the streaming media signal.

22. The method of claim 19, further comprising receiving an over the air download of a software update at the portable wireless device.

23. The method of claim 22, wherein the software update is an update for an application that includes instructions for receiving the streaming media signal in the portable wireless device corresponding to the regional broadcasting channel.

24. The method of claim 19, wherein the separate electronic device includes an in-band on-channel receiver, further comprising:
   receiving a collection of data via the in-band on-channel receiver;
   identifying a song for subsequent downloading; and
   receiving data representing the song.

25. The method of claim 24, wherein the data representing the song is received by a computer of a user, further comprising:
   storing an audio file representing the song; and
   communicating a copy of the audio file to the portable wireless device.

* * * * *

US007778595C1

(12) INTER PARTES REEXAMINATION CERTIFICATE (1067th)
United States Patent
White et al.

(10) Number: US 7,778,595 C1
(45) Certificate Issued: Mar. 13, 2015

(54) METHOD FOR MANAGING MEDIA

(75) Inventors: Russell W. White, Austin, TX (US);
Kevin R. Imes, Austin, TX (US)

(73) Assignee: Affinity Labs of Texas, LLC, Austin, TX (US)

Reexamination Request:
No. 95/001,782, Oct. 13, 2011

Reexamination Certificate for:
Patent No.: 7,778,595
Issued: Aug. 17, 2010
Appl. No.: 12/015,320
Filed: Jan. 16, 2008

Related U.S. Application Data

(63) Continuation of application No. 10/947,755, filed on Sep. 23, 2004, now Pat. No. 7,324,833, and a continuation of application No. 09/537,812, filed on Mar. 28, 2000, now Pat. No. 7,187,947.

(51) Int. Cl.
*H04H 40/00* (2008.01)
*H04W 4/06* (2009.01)
*G06F 3/0488* (2013.01)
*H04L 29/06* (2006.01)
*H04W 88/06* (2009.01)
*H04L 29/08* (2006.01)
*G06F 3/0484* (2013.01)
*G06F 3/0482* (2013.01)
*H04M 1/725* (2006.01)

(52) U.S. Cl.
CPC .............. *H04W 4/06* (2013.01); *G06F 3/0488* (2013.01); *H04L 65/60* (2013.01); *H04W 88/06* (2013.01); *H04L 67/02* (2013.01); *G06F 3/04842* (2013.01); *G06F 3/0482* (2013.01); *H04M 1/72547* (2013.01); *H04M 1/72558* (2013.01); *H04M 1/72561* (2013.01); *H04M 1/7255* (2013.01); *H04M 60/27* (2013.01); *H04M 2250/64* (2013.01); *H04M 1/7253* (2013.01)
USPC .......................................... 455/3.06; 455/566

(58) Field of Classification Search
None
See application file for complete search history.

(56) References Cited

To view the complete listing of prior art documents cited during the proceeding for Reexamination Control Number 95/001,782, please refer to the USPTO's public Patent Application Information Retrieval (PAIR) system under the Display References tab.

*Primary Examiner* — Adam L Basehoar

(57) ABSTRACT

An audio system and method are disclosed. A system incorporating teachings of the present disclosure may include, for example, an electronic device having a display, a wireless receiver, and a housing component at least partially defining a cavity in which the wireless receiver is secured. The system may also include a device interface system that has a sound system connector and a mounting region. The sound system connector may communicatively coupled the device interface system to an existing sound system, and the mounting region may be capable of releasably engaging the electronic device such that a contact portion of the device interface system contacts a conductive element of the electronic device to form at least a portion of a communication path interconnecting the sound system and the electronic device.

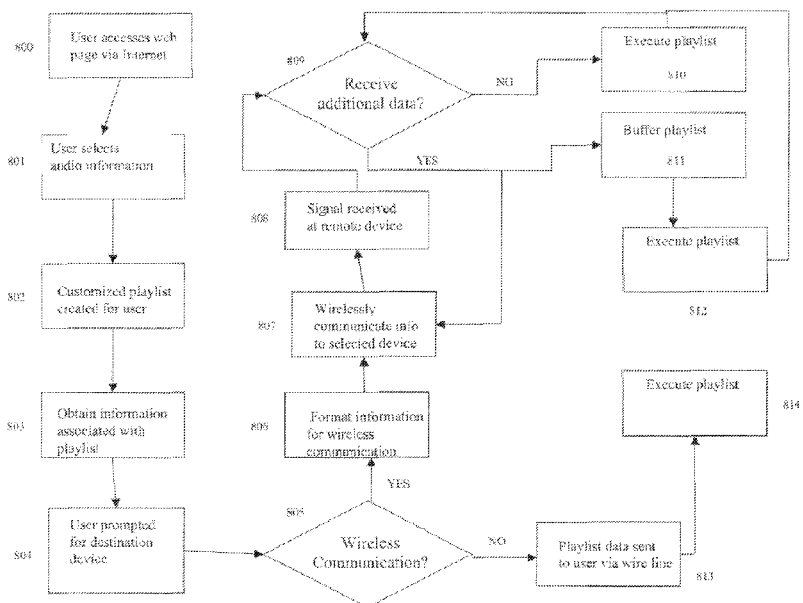

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

The patentability of claims 2, 12, 13, 20, 24 and 25 is confirmed.

Claims 1, 3-11, 14-19 and 21-23 are cancelled.

\* \* \* \* \*